US012640138B2

(12) United States Patent
Liu et al.

(10) Patent No.: US 12,640,138 B2
(45) Date of Patent: May 26, 2026

(54) REAL-TIME VOICE RECOGNITION METHOD, MODEL TRAINING METHOD, APPARATUSES, DEVICE, AND STORAGE MEDIUM

(71) Applicant: Tencent Technology (Shenzhen) Company Limited, Guangdong (CN)

(72) Inventors: Jingjing Liu, Guangdong (CN); Bihong Zhang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 259 days.

(21) Appl. No.: 18/384,009

(22) Filed: Oct. 26, 2023

(65) Prior Publication Data

US 2024/0062744 A1 Feb. 22, 2024

Related U.S. Application Data

(63) Continuation of application No. PCT/CN2022/142596, filed on Dec. 28, 2022.

(30) Foreign Application Priority Data

Mar. 15, 2022 (CN) .......................... 202210253123.0

(51) Int. Cl.
*G10L 15/06* (2013.01)
*G10L 15/02* (2006.01)
(Continued)

(52) U.S. Cl.
CPC ............ *G10L 15/063* (2013.01); *G10L 15/02* (2013.01); *G10L 15/04* (2013.01); *G10L 19/16* (2013.01)

(58) Field of Classification Search
None
See application file for complete search history.

(56) References Cited

U.S. PATENT DOCUMENTS

| | | | |
|---|---|---|---|
| 11,551,668 B1 * | 1/2023 | Baevski | G06F 18/2155 |
| 11,646,017 B1 * | 5/2023 | Shi | G06N 3/08 |
| | | | 704/232 |

(Continued)

FOREIGN PATENT DOCUMENTS

| | | |
|---|---|---|
| CN | 110619871 A | 12/2019 |
| CN | 111696526 | 9/2020 |

(Continued)

OTHER PUBLICATIONS

Tian, Zhengkun, et al. "Self-attention transducers for end-to-end speech recognition." arXiv preprint arXiv:1909.13037 (2019). (Year: 2019).*

(Continued)

*Primary Examiner* — Douglas Godbold
(74) *Attorney, Agent, or Firm* — Crowell & Moring LLP

(57) ABSTRACT

A real-time voice recognition method and a real-time voice recognition model training method are provided. The model training method includes: obtaining an audio feature sequence of sample voice data, the audio feature sequence comprising audio features of a plurality of audio frames of the sample voice data; inputting the audio feature sequence to an encoder of the real-time voice recognition model; chunking the audio feature sequence into a plurality of chunks by the encoder according to a mask matrix; encoding each of the chunks to obtain a hidden layer feature sequence of the sample voice data; decoding the hidden layer feature sequence by a decoder of the real-time voice recognition model to obtain a predicted recognition result for the sample voice data; and training the real-time voice recognition model based on the predicted recognition result and a real recognition result of the sample voice data.

17 Claims, 14 Drawing Sheets

(51) Int. Cl.
    *G10L 15/04* (2013.01)
    *G10L 19/16* (2013.01)

(56) References Cited

U.S. PATENT DOCUMENTS

| | | | | |
|---|---|---|---|---|
| 11,715,462 B2 * | 8/2023 | Wu | ........................ | G10L 15/063 |
| | | | | 704/232 |
| 11,915,690 B1 * | 2/2024 | Chang | ................... | G10L 19/008 |
| 2019/0189111 A1 | 6/2019 | Watanabe et al. | | |
| 2021/0183373 A1 * | 6/2021 | Moritz | ................... | G06N 3/045 |
| 2022/0215832 A1 * | 7/2022 | Ren | ......................... | G10L 15/16 |
| 2022/0351718 A1 * | 11/2022 | Wu | ......................... | G06N 3/08 |
| 2023/0064756 A1 * | 3/2023 | Zhang | ..................... | G10L 15/30 |

FOREIGN PATENT DOCUMENTS

| | | |
|---|---|---|
| CN | 113362812 A | 9/2021 |
| CN | 113889076 A | 1/2022 |
| CN | 114023309 | 2/2022 |
| CN | 114141240 A | 3/2022 |
| CN | 114596841 | 6/2022 |

OTHER PUBLICATIONS

Tsunoo, Emiru, et al. "Towards online end-to-end transformer automatic speech recognition." arXiv preprint arXiv:1910.11871 (2019 ). (Year: 2019).*

Office action in Chinese application No. 202210253123.0, dated Jul. 19, 2024, 22 pages (with English translation).

International Search Report issued Mar. 27, 2023 in International (PCT) Application No. PCT/CN2022/142596.

Yao, Zhuoyuan et al. "WeNet: Production Oriented Streaming and Non-streaming End-to-End Speech Recognition Toolkit" arXiv: 2102.01547v5, Dec. 29, 2021 (Dec. 29, 2021), section 2.

Chen, Xie et al. "Developing Real-Time Streaming Transformer Transducer for Speech Recognition on Large-Scale Dataset" arXiv: 2010.11395v3, Feb. 28, 2021 (Feb. 28, 2021), section 3.

Chen et al. "Developing Real-Time Streaming Transformer Transducer for Speech Recognition on Large-Scale Dataset," IEEE International Conference on Acoustics, Speech and Signal Processing, Feb. 2021, 5 pages.

Office action in Chinese application No. CN 202210253123.0, dated May 23, 2024, 26 pages (with English Translation).

* cited by examiner

610

Obtain an audio feature sequence of a target chunk of voice data, the target chunk including at least two consecutive audio frames in the voice data, and the audio feature sequence of the target chunk including audio features of the audio frames contained in the target chunk

620

Obtain an intermediate processing result for a historical chunk corresponding to the target chunk from data stored in a buffer region, and encode the audio feature sequence of the target chunk using the intermediate processing result for the historical chunk to obtain hidden layer features of the target chunk, the hidden layer features being encoded features of the target chunk, and the historical chunk referring to an encoded chunk having at least one overlapping audio frame with the target chunk

630

Decode to obtain a real-time voice recognition result for the target chunk according to the hidden layer features

FIG. 6

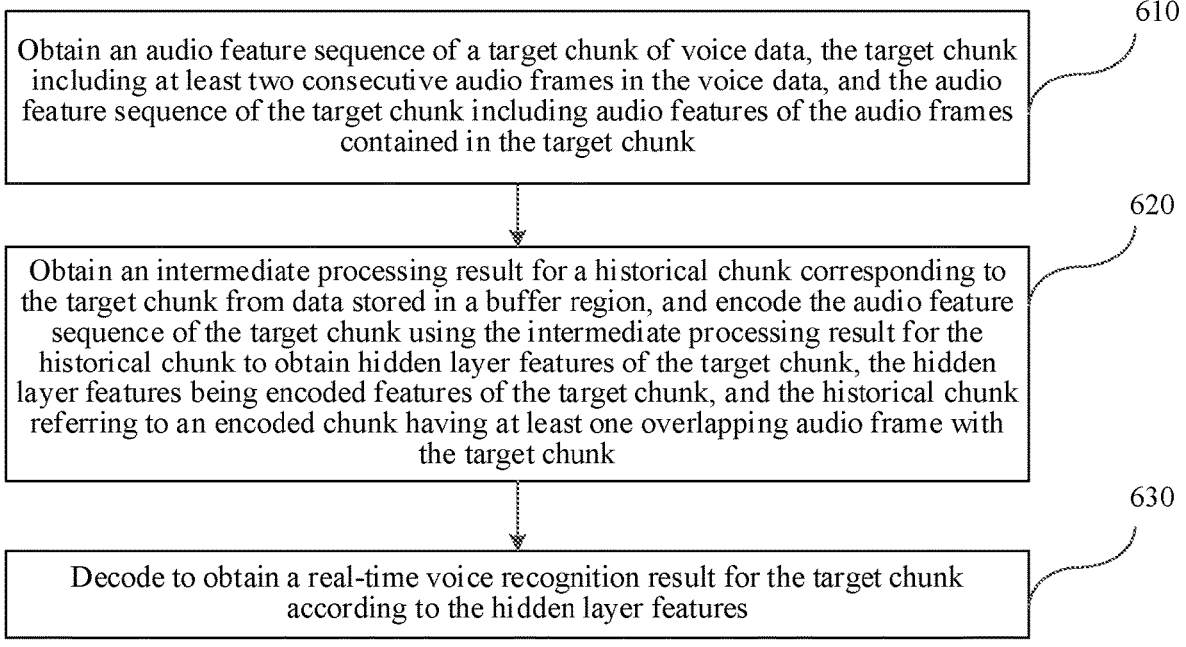

FIG. 7

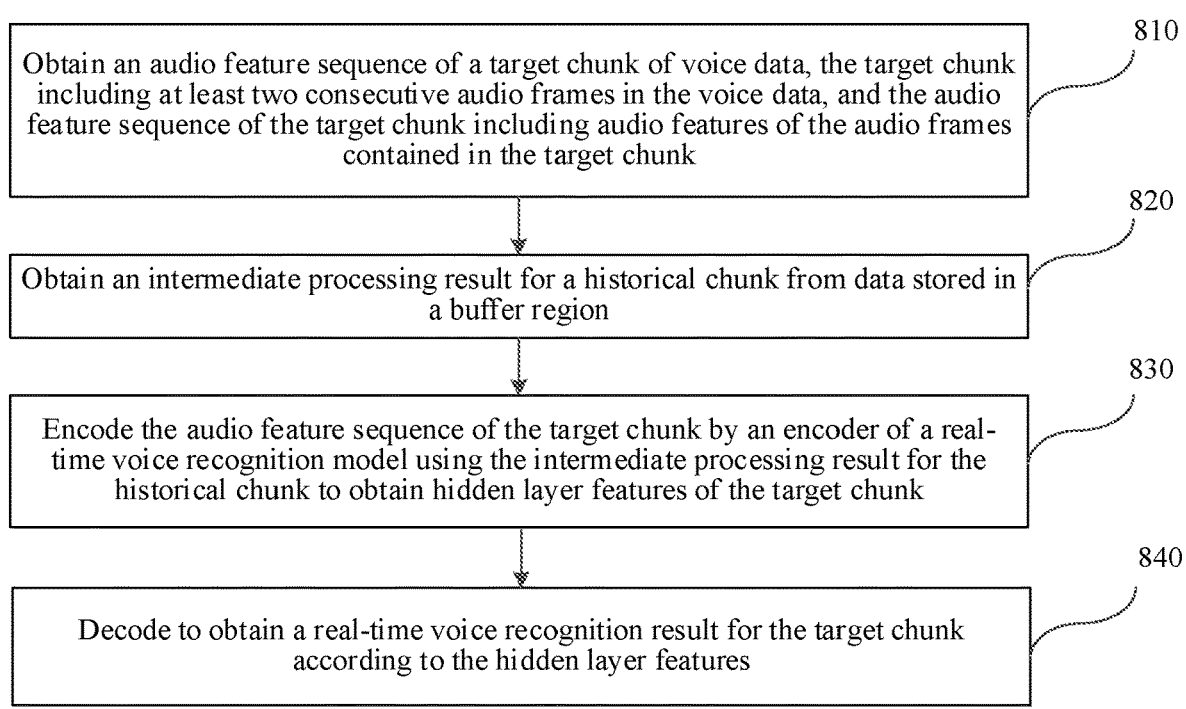

Obtain an audio feature sequence of a target chunk of voice data, the target chunk including at least two consecutive audio frames in the voice data, and the audio feature sequence of the target chunk including audio features of the audio frames contained in the target chunk — 810

Obtain an intermediate processing result for a historical chunk from data stored in a buffer region — 820

Encode the audio feature sequence of the target chunk by an encoder of a real-time voice recognition model using the intermediate processing result for the historical chunk to obtain hidden layer features of the target chunk — 830

Decode to obtain a real-time voice recognition result for the target chunk according to the hidden layer features — 840

FIG. 8

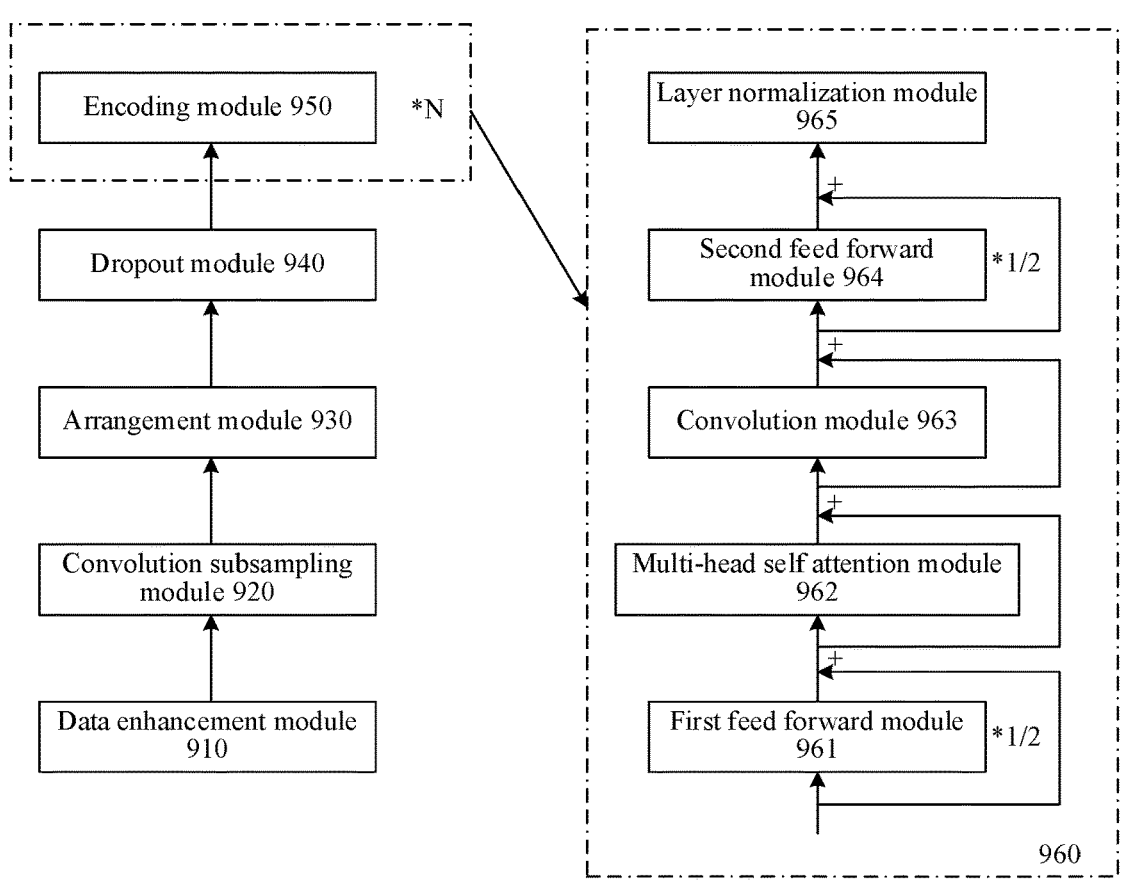

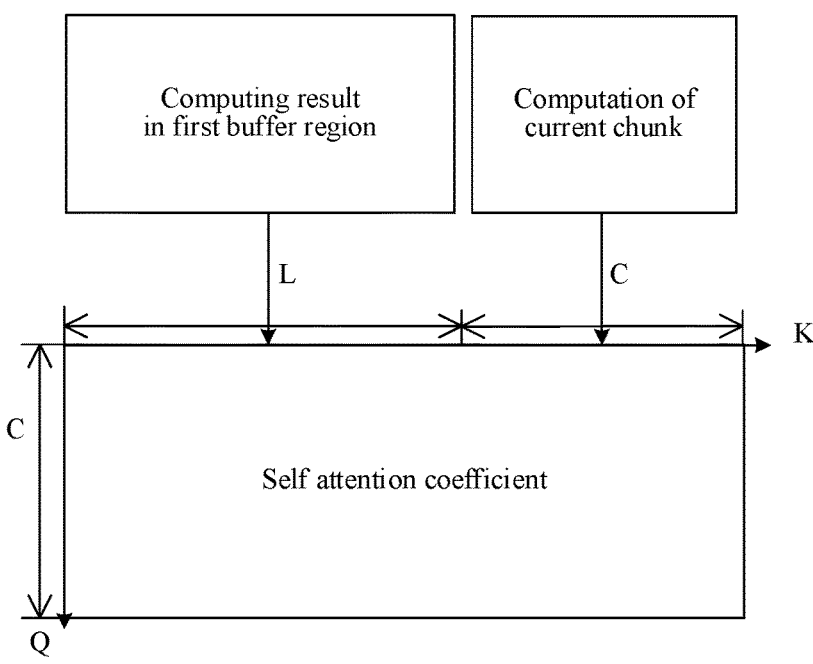

FIG. 14

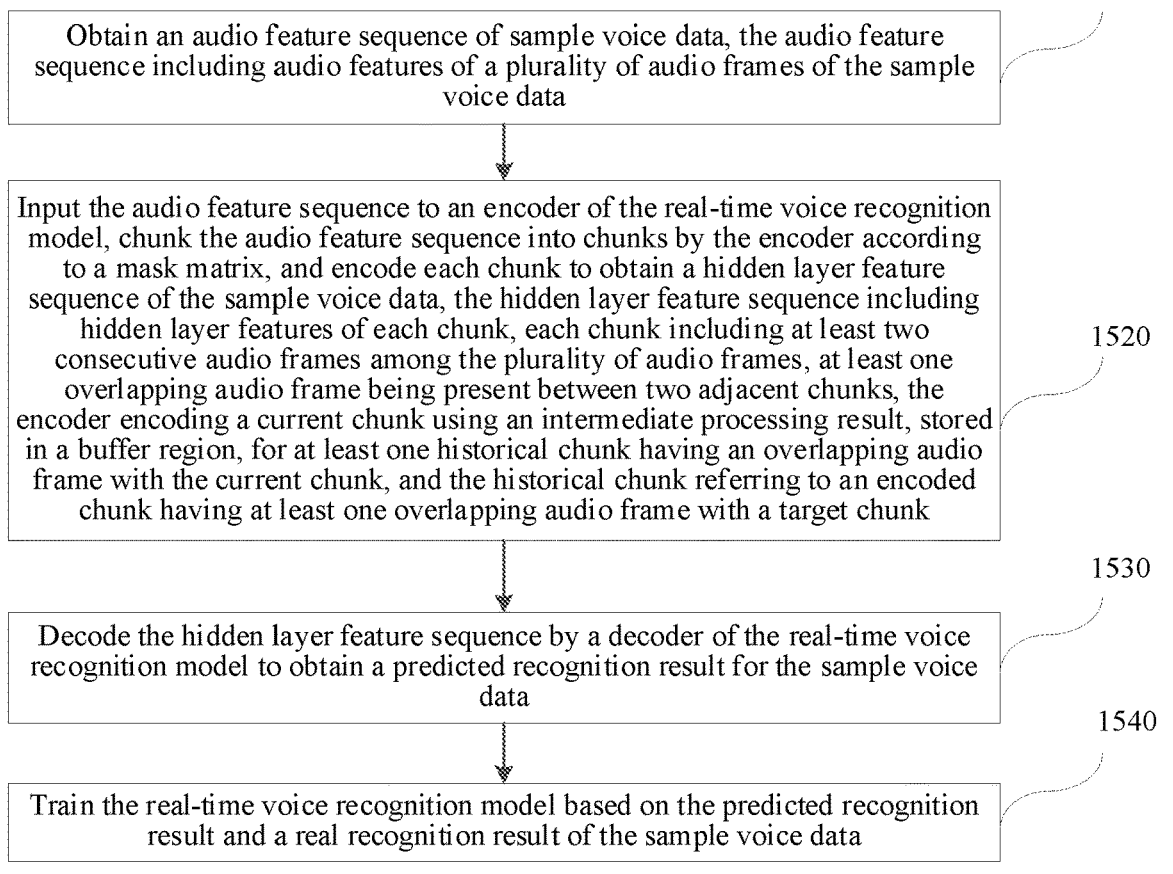

1510

Obtain an audio feature sequence of sample voice data, the audio feature sequence including audio features of a plurality of audio frames of the sample voice data

1520

Input the audio feature sequence to an encoder of the real-time voice recognition model, chunk the audio feature sequence into chunks by the encoder according to a mask matrix, and encode each chunk to obtain a hidden layer feature sequence of the sample voice data, the hidden layer feature sequence including hidden layer features of each chunk, each chunk including at least two consecutive audio frames among the plurality of audio frames, at least one overlapping audio frame being present between two adjacent chunks, the encoder encoding a current chunk using an intermediate processing result, stored in a buffer region, for at least one historical chunk having an overlapping audio frame with the current chunk, and the historical chunk referring to an encoded chunk having at least one overlapping audio frame with a target chunk

1530

Decode the hidden layer feature sequence by a decoder of the real-time voice recognition model to obtain a predicted recognition result for the sample voice data

1540

Train the real-time voice recognition model based on the predicted recognition result and a real recognition result of the sample voice data

REAL-TIME VOICE RECOGNITION METHOD, MODEL TRAINING METHOD, APPARATUSES, DEVICE, AND STORAGE MEDIUM

RELATED APPLICATION

This application is a continuation application of PCT Patent Application No. PCT/CN2022/142596, filed on Dec. 28, 2022, which claims priority to Chinese Patent Application No. 202210253123.0, entitled "REAL-TIME VOICE RECOGNITION METHOD, MODEL TRAINING METHOD, APPARATUSES, AND DEVICE" filed to the China National Intellectual Property Administration on Mar. 15, 2022, wherein the content of the above-referenced applications is incorporated herein by reference in its entirety.

FIELD OF THE TECHNOLOGY

This disclosure relates to the technical field of artificial intelligence, and in particular, to a real-time voice recognition method, a model training method, apparatuses, a device, and a storage medium.

BACKGROUND OF THE DISCLOSURE

Voice recognition refers to the recognition of voice data provided by objects to obtain corresponding text data.

The voice recognition is generally divided into real-time voice recognition and non-real-time voice recognition. The non-real-time voice recognition refers to recognition by a system after an object finishes a sentence or a paragraph. The real-time voice recognition refers to synchronous recognition by the system when the object is still speaking. In the real-time voice recognition scenario, the recognition speed and delay often become the bottleneck of actual implementation thereof.

SUMMARY

This disclosure provides a real-time voice recognition method, a model training method, apparatuses, a device, and a storage medium, to solve the technical problem that voice recognition has a large delay due to a large amount of computation during encoding. The technical solutions are as follows.

This disclosure provides a real-time voice recognition method, which is performed by a computer device. The computer device is deployed with a real-time voice recognition model. The method includes:

obtaining an audio feature sequence of a target chunk of voice data, the target chunk comprising at least two consecutive audio frames in the voice data, and the audio feature sequence of the target chunk comprising audio features of the audio frames contained in the target chunk;

obtaining an intermediate processing result for a historical chunk corresponding to the target chunk from data stored in a buffer region;

encoding the audio feature sequence of the target chunk using the intermediate processing result for the historical chunk to obtain hidden layer features of the target chunk, the hidden layer features being encoded features of the target chunk, and the historical chunk referring to an encoded chunk having at least one overlapping audio frame with the target chunk; and

decoding to obtain a real-time voice recognition result for the target chunk according to the hidden layer features.

This disclosure further provides a method for training a real-time voice recognition model. The method includes:

obtaining an audio feature sequence of sample voice data, the audio feature sequence comprising audio features of a plurality of audio frames of the sample voice data;

inputting the audio feature sequence to an encoder of the real-time voice recognition model;

chunking the audio feature sequence into a plurality of chunks by the encoder according to a mask matrix;

encoding each of the chunks to obtain a hidden layer feature sequence of the sample voice data, the hidden layer feature sequence comprising hidden layer features of each of the chunks, a chunk comprising at least two consecutive audio frames among the plurality of audio frames, at least one overlapping audio frame being present between two adjacent chunks, the encoder encoding a current chunk using an intermediate processing result, stored in a buffer region, for at least one historical chunk having an overlapping audio frame with the current chunk, and the historical chunk referring to an encoded chunk having at least one overlapping audio frame with a target chunk;

decoding the hidden layer feature sequence by a decoder of the real-time voice recognition model to obtain a predicted recognition result for the sample voice data; and training the real-time voice recognition model based on the predicted recognition result and a real recognition result of the sample voice data.

This disclosure further provides an apparatus for training a real-time voice recognition model. The apparatus includes a memory operable to store computer-readable instructions and a processor circuitry operable to read the computer-readable instructions. When executing the computer-readable instructions, the processor circuitry is configured to:

obtain an audio feature sequence of sample voice data, the audio feature sequence comprising audio features of a plurality of audio frames of the sample voice data;

input the audio feature sequence to an encoder of the real-time voice recognition model;

chunk the audio feature sequence into a plurality of chunks by the encoder according to a mask matrix;

encode each of the chunks to obtain a hidden layer feature sequence of the sample voice data, the hidden layer feature sequence comprising hidden layer features of each of the chunks, a chunk comprising at least two consecutive audio frames among the plurality of audio frames, at least one overlapping audio frame being present between two adjacent chunks, the encoder encoding a current chunk using an intermediate processing result, stored in a buffer region, for at least one historical chunk having an overlapping audio frame with the current chunk, and the historical chunk referring to an encoded chunk having at least one overlapping audio frame with a target chunk;

decode the hidden layer feature sequence by a decoder of the real-time voice recognition model to obtain a predicted recognition result for the sample voice data; and train the real-time voice recognition model based on the predicted recognition result and a real recognition result of the sample voice data.

This embodiment of this disclosure further provides a computer device. The computer device includes a processor and a memory. The memory stores at least one instruction, at least one program, and a code set or instruction set. The at least one instruction, the at least one program, and the code set or instruction set are loaded and executed by the processor to implement the real-time voice recognition method or the method for training a real-time voice recognition model.

This embodiment of this disclosure further provides a computer-readable storage medium. The computer-readable storage medium stores at least one instruction, at least one program, and a code set or instruction set. The at least one instruction, the at least one program, and the code set or instruction set are loaded and executed by a processor to implement the real-time voice recognition method or the method for training a real-time voice recognition model.

This embodiment of this disclosure further provides a computer program product or a computer program. The computer program product or the computer program includes computer instructions. The computer instructions are stored in a computer-readable storage medium. A processor of a computer device reads the computer instructions from the computer-readable storage medium. The processor executes the computer instructions, whereby the computer device performs the real-time voice recognition method or the method for training a real-time voice recognition model.

BRIEF DESCRIPTION OF THE DRAWINGS

FIG. 6 is a flow chart of a real-time voice recognition method according to some embodiments of this disclosure.

FIG. 7 is a schematic diagram of division of target chunks of voice data according to some embodiments of this disclosure.

FIG. 8 is a flow chart of a real-time voice recognition method according to another embodiment of this disclosure.

FIG. 9 is a schematic structural diagram of a Conformer network according to some embodiments of this disclosure.

FIG. 14 is a schematic diagram of computing using a buffer region according to some embodiments of this disclosure.

FIG. 15 is a flow chart of a method for training a real-time voice recognition model according to some embodiments of this disclosure.

DESCRIPTION OF EMBODIMENTS

To make the objects, technical solutions, and advantages of this disclosure clearer, the following further describes implementations of this disclosure in detail with reference to the accompanying drawings.

The schemes provided by this embodiment of this disclosure relate to a voice technology of artificial intelligence, a machine learning technology, and other technologies, and are specifically described by the following embodiments.

In some end-to-end real-time voice recognition schemes, a voice recognition model including an encoder and a decoder is constructed, audio features of voice data inputted by an object are inputted to the encoder, the encoder encodes the audio features to obtain hidden layer features, and then the decoder decodes to obtain corresponding voice recognition results according to the hidden layer features. However, this mode has a large amount of computation in the encoding process, which leads to a large delay in voice recognition.

Figure 1:
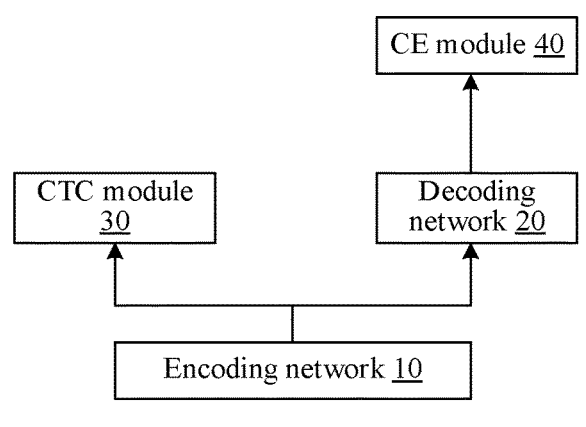
FIG. 1 is a schematic diagram of an attention based encoder-decoder (AED)-connectionist temporal classification (CTC)/attention architecture according to some embodiments of this disclosure.

The voice recognition model adopts an AED-CTC/Attention architecture. The architecture is shown in FIG. 1 and includes an encoding network 10, a decoding network 20, a CTC module 30, and a cross entropy (CE) module 40. The encoding network 10 models acoustic features. The decoding network 20 models language features in combination with the acoustic features. The CTC module 30 may automatically learn word boundary alignment. The automatic alignment capability of the CTC module 30 enables the text and acoustic features to have a stronger monotonic alignment relationship. The decoding network 20 may avoid problems such as long sentence truncation. The joint modeling capability of the decoding network 20 also enables CTC to have a richer text context capability and stronger recognition capability. In an end-to-end real-time recognition system based on AED-CTC/Attention, the encoding network 10 may encode only part of the audio features up to a current time or including a finite future time, and then decode using the encoded information and historical prediction. The usual practice is to chunk audio and perform attention computation in the chunks.

Herein, the term "module" (and other similar terms such as unit, submodule, etc.) refers to computing software, firmware, hardware, and/or various combinations thereof. At a minimum, however, modules are not to be interpreted as software that is not implemented on hardware, firmware, or recorded on a non-transitory processor readable recordable storage medium. Indeed "module" is to be interpreted to include at least some physical, non-transitory hardware such as a part of a processor, circuitry, or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices. The modules can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The modules can also be implemented in hardware using processors or circuitry on the same or different integrated circuit.

In the model training stage, the CTC Module 30 and the CE Module 40 respectively compute a training loss, and adjust parameters of the voice recognition model based on the computed training loss. In some embodiments, the encoding network 10 uses a Conformer structure, and the decoding network 20 uses a Transformer structure. The CTC module 30 is added at the end of the encoding network 10 to compute a CTC loss, and the CE module 40 is added at an output end of the decoding network 20 to compute a CE loss. The parameters of the whole model are updated in combination with two training criteria (namely, the two losses).

In the model using stage, the decoding network 20 and the CE module 40 are removed, and only the encoding network 10 and the CTC module are used for generating an acoustic posterior probability. Then, an n-gram voice model is introduced. A recognition result is obtained by searching a constructed weighted finite state transducer (WFST) graph for decoding.

The Transformer network is a deep self attention transformation network, which is also commonly used as all similar deep self attention transformation network structures. The Transformer network breaks through the limitation that a recurrent neural network cannot perform parallel computing. Compared with convolutional neural network, the number of operations required for computing an association between two locations is not increased with distance, and self attention may produce a more interpretable model.

The Conformer network is a convolution-enhanced Transformer network. Conformer uses convolution to enhance the effect of Transformer in the field of voice recognition. By utilizing, at an encoding end, the characteristics that Transformer is skilled in capturing global features and the convolutional neural network is capable of effectively representing local features, the two networks are combined to better extract the global and local dependencies of audio features, thus enhancing the effect of voice recognition.

Figure 2:
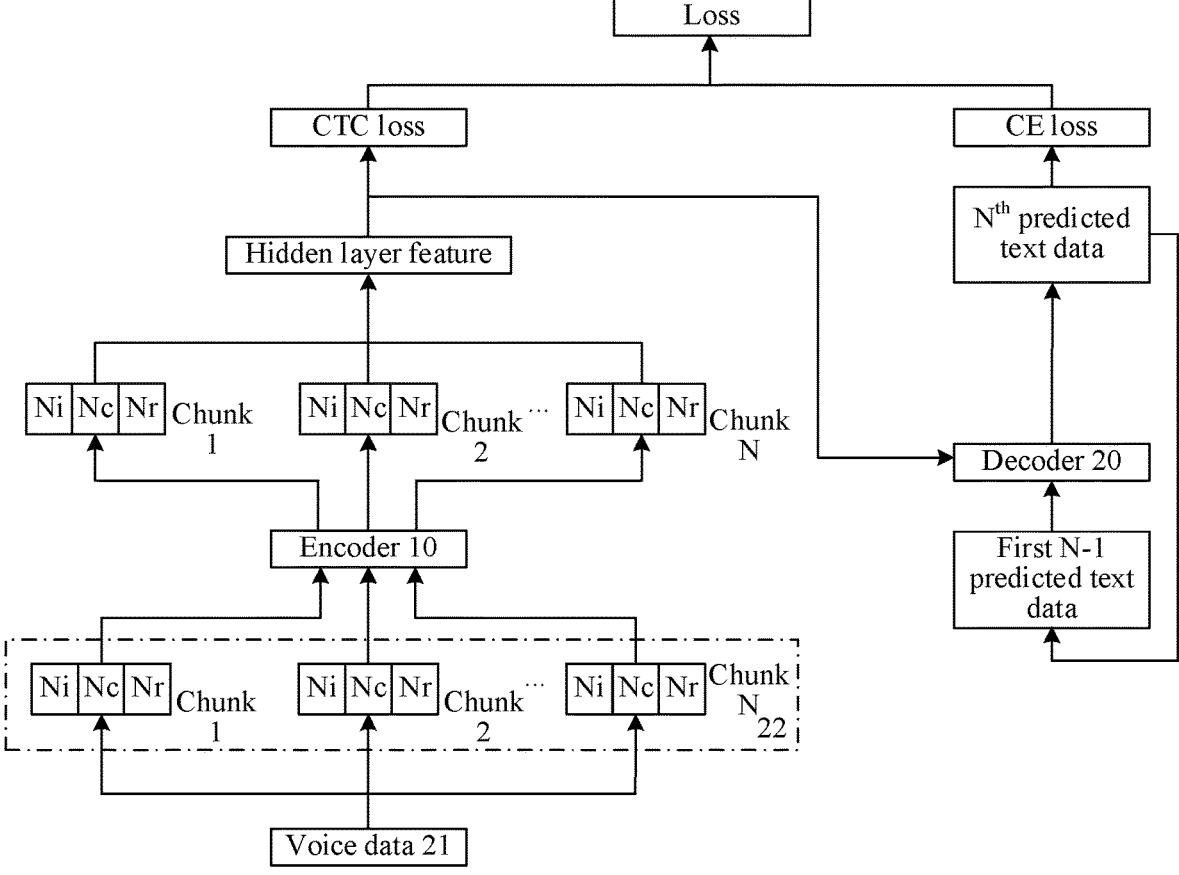
FIG. 2 is a training diagram of a real-time voice recognition model based on a chunk operation according to some embodiments of this disclosure.

In some embodiments, as shown in FIG. 2, FIG. 2 exemplarily shows a training diagram of a real-time voice recognition model based on a chunk operation. FIG. 2 is also an expanded view of an architecture diagram given in FIG. 1. In the training stage of the real-time voice recognition model, input voice data 21 is first divided into a plurality of chunks based on audio frames. Each chunk contains a plurality of consecutive audio frames. In some embodiments, each chunk contains the same number of audio frames. Definitely in some other embodiments, the number of audio frames contained in each chunk may also be different, which is not limited in this disclosure. The audio frames contained in each chunk are divided into historical frames, valid frames, and future frames. The input voice data is chunked based on the set number of valid frames. In this embodiment of this disclosure, the number of audio frames for each chunk is set to be the same. Also, since the chunks are divided based on the valid frames, the historical frame of a chunk is required to partially overlap the valid frame of the previous chunk. Therefore, there is an overlapping part between the chunks. The valid frame is the part of the chunk that is required to be recognized by voice. The historical frame and the future frame are used for assisting the valid frame part in a voice recognition chunk. The historical frame is a frame preceding the valid frame, and the future frame is a frame following the valid frame. The historical frame preceding the valid frame and the future frame following the valid frame assist the valid frame part in the chunk in voice recognition. As in region 22 in FIG. 2, voice data divided into a plurality of chunks is shown in region 22, where Nc represents valid frames of the chunks, Ni represents historical frames of the chunks, and Nr represents future frames of the chunks. In some embodiments, a future frame part of chunk 1 may overlap a valid frame part of chunk 2, and a historical frame part of chunk 2 may overlap a valid frame part of chunk 1. Then each chunk is encoded by the encoder to obtain a hidden layer feature sequence of each chunk, and a complete hidden layer feature sequence corresponding to the voice data is obtained after splicing and combining the hidden layer feature sequences of the chunks. Also, in order to realize the controllable decoding delay, the encoder randomly selects parameters of a group of chunks to perform a chunk operation when training each recognition result in a dynamic chunk manner.

Finally, the decoder decodes the complete hidden layer feature sequence to obtain a predicted recognition result (such as predicted text information). A training loss of the complete hidden layer feature sequence is computed based on the CTC module, and the parameters of the encoder are adjusted. A training loss of the predicted recognition result is computed based on the CE module, and the parameters of the encoder and the decoder are adjusted. In order to keep the consistency with a training policy, after an object starts to input voice, an acoustic posterior probability of a chunk starts to be computed when voice features of Ni+Nc+Nr frames are accumulated. Finally, only a posterior probability of the valid frame namely the Nc frame is taken out, and then the recognition result is obtained by decoding using a CTC-WFST graph.

Figure 3:
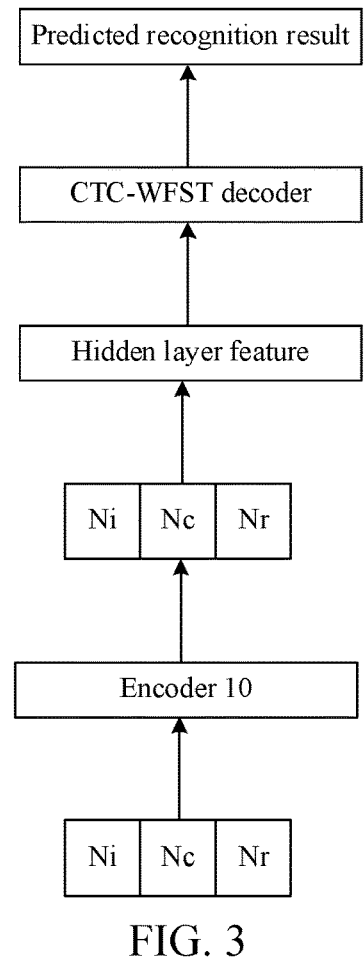
FIG. 3 is a schematic diagram of a real-time voice recognition model according to some embodiments of this disclosure during the use stage.

In some embodiments, as shown in FIG. 3, FIG. 3 exemplarily shows a schematic diagram of a voice recognition model in an actual use stage. In order to increase the speed of voice recognition, audio frames are extracted by voice data inputted in real time in the use stage of the voice recognition model. When the number of audio frames meets the number of audio frames of a chunk, the chunks obtained above are inputted to the encoder for encoding to obtain a hidden layer feature sequence of the chunk. A complete hidden layer feature sequence corresponding to the voice data is obtained by combining the hidden layer feature sequences of the chunks. Finally, the complete hidden layer feature sequence is decoded to obtain predicted text information.

Figure 4:
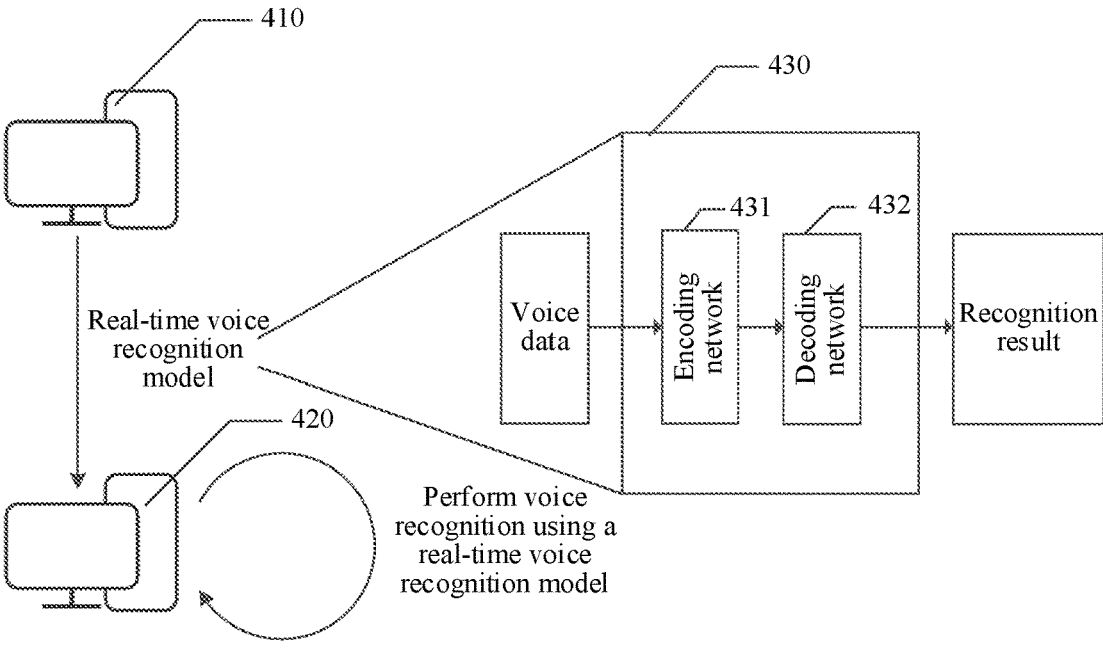
FIG. 4 is a schematic diagram of a scheme implementation environment according to some embodiments of this disclosure.

FIG. 4 shows a schematic diagram of a scheme implementation environment according to some embodiments of this disclosure. The scheme implementation environment may be implemented as a real-time voice recognition system for recognizing voice data inputted by objects, such as realizing the function of real-time voice recognition. The scheme implementation environment may include: a model training device 410 and a model using device 420. The model training device 410 may be a terminal device or a server. Similarly, the model using device 420 may be a terminal device or a server.

The model training device 410 may be an electronic device such as a computer, a server, and an intelligent robot, or some other electronic devices having a strong computing power. The model training device 410 is configured to train a real-time voice recognition model 430. In this embodiment of this disclosure, the real-time voice recognition model 430 is a model for recognizing voice data, and the real-time voice recognition model 430 may include an encoding network 431 and a decoding network 432. The model training device 410 may train the voice recognition model 430 in a machine learning manner, whereby the voice recognition model has better performance.

The trained real-time voice recognition model 430 may be deployed in the model using device 420 to recognize the voice data and obtain a corresponding recognition result (namely, predicted text data). The model using device 420 may be a terminal device such as a mobile phone, a computer, a smart TV, a multimedia playback device, a wearable device, a medical device, a smart voice interaction device, a smart home appliance, and a vehicle-mounted terminal device, or a server, which is not limited in this disclosure. This embodiment of this disclosure may be applied to various scenarios including, but not limited to, artificial intelligence, intelligent transportation, and driver assistance.

The terminal device may be an electronic device such as a mobile phone, a tablet computer, a personal computer (PC), a wearable device, a vehicle-mounted terminal device, a virtual reality (VR) device, and an augmented reality (AR) device, which is not limited in this disclosure. A client of an application may be installed and run in the terminal device.

In this embodiment of this disclosure, the application refers to an application capable of recognizing voice data inputted by an object. Exemplarily, the application may be an application in which the object may input the voice data, such as an input method class application, a social class application, an interactive entertainment class application, and a map navigation class application.

The server may be an independent physical server, a server cluster or distributed system composed of a plurality of physical servers, or a cloud server providing cloud computing services. The server may be a background server of the application for providing background services for the client of the application, for example, recognizing the voice data inputted by the object, transmitting the voice data to the client, and displaying text information corresponding to the voice data in the client. In some embodiments, voice recognition may also be performed locally by the client which is not limited in this disclosure.

In some embodiments, the application may be a stand-alone application (APP) developed separately, or an applet, or another form of application such as a web application, which is not limited in this disclosure.

The terminal device may communicate with the server via a network.

In some embodiments, the object inputs voice data in the corresponding client of the application. The voice data may be inputted by the object in real time. The client of the application obtains the voice data inputted by the object, and transmits the voice data to the server. The server recognizes the voice data to obtain corresponding predicted text data. Then, the recognized predicted text data is transmitted to the client and displayed in the client.

Figure 5:
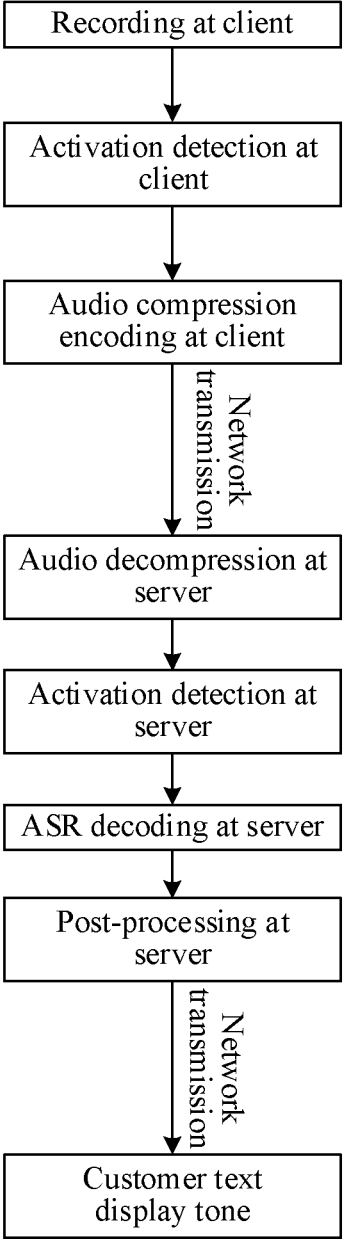
FIG. 5 is a workflow chart of real-time voice recognition in an disclosure according to some embodiments of this disclosure.

In some embodiments, the real-time voice recognition model of this disclosure may be used for online real-time voice recognition products with different delay requirements, such as voice input methods, voice notes, vehicle-mounted intelligent voice recognition, simultaneous interpretation, and online livestreaming voice recognition products. As shown in FIG. 5, FIG. 5 exemplarily shows a workflow chart of real-time voice recognition in an application. The object clicks/taps a button to start inputting voice. The client starts a recording function, detects a valid voice segment through client voice activity detection (VAD), and uploads the valid voice segment to a background server after audio compression encoding. The server first completes audio decompression, then further detects the valid voice segment through the server VAD, and transmits the valid voice segment to a server-side voice recognition decoder for recognition and decoding. After a post-processing operation, the recognition result is transmitted back to the client through the network and presented to the object. This disclosure optimizes a server-side ASR decoding part in FIG. 5 and provides methods for using and training a real-time voice recognition model described in the following embodiments.

FIG. 6 shows a flow chart of a real-time voice recognition method according to some embodiments of this disclosure. The executive entity of the method may be the model using device 20 in the scheme implementation environment shown in FIG. 1. The method may include at least one of the following steps (610-630):

Step 610: Obtain an audio feature sequence of a target chunk of voice data, the target chunk including at least two consecutive audio frames in the voice data, and the audio feature sequence of the target chunk including audio features of the audio frames contained in the target chunk.

In some embodiments, the process of acquiring voice data and the process of recognizing voice data may be performed in the same device, for example, both in a terminal device. In some embodiments, the process of acquiring voice data and the process of recognizing voice data may also be performed in different devices. For example, the process of acquiring voice data is performed by a terminal device, the terminal device then transmits the acquired voice data to a server, and the server recognizes the voice data.

The voice data is voice data to be recognized, provided by an object in a client. For example, the voice data may be voice data inputted or recorded by the object in real time in the client, or may be voice data recorded in advance. By recognizing the voice data inputted by the object, corresponding text data may be obtained. For example, if the object is intended to input text data "good morning" in the client, the object may input voice data corresponding to the text data "good morning" in a corresponding voice input region of the client.

The voice data may be framed by time to obtain a plurality of audio frames, and the audio frames have the same time. The target chunk is part of voice data obtained by chunking the voice data. The voice data is divided according to the number of frames to obtain a plurality of chunks. In some embodiments, the number of frames contained by the plurality of chunks is the same, and each chunk includes at least two consecutive audio frames. Definitely in some other embodiments, the number of frames contained in the plurality of chunks may also be different, which is not limited in this disclosure. This disclosure mainly describes an example where the number of frames included in the plurality of chunks is the same.

In some embodiments, each chunk includes: at least one valid frame, at least one historical frame preceding the valid frame, and at least one future frame following the valid frame.

The chunk is composed of a valid frame, a historical frame, and a future frame. The valid frame is an audio frame to be recognized in the chunk. The historical frame and the future frame are audio frames used for assisting in improving the accuracy of the recognition result. The recognition result for the valid frame part is more accurately recognized by the preceding and following audio frames through relationships between the valid frame and the historical frame and between the valid frame and the future frame. In some embodiments, as more valid frames and future frames are selected, the recognition result for the valid frame part is more accurate, but the delay of the voice recognition scenario is greater. As fewer valid frames and future frames are selected, the recognition result for the valid frame part is more inaccurate, and the delay of the voice recognition scenario is smaller. Since the chunking is performed according to the valid frames, there is an overlapping part between the chunks (the overlapping part is an overlapping partial audio frame).

The audio feature sequence of the target chunk is a set of audio features corresponding to the audio frames of the target chunk. For each audio frame of the target chunk, the audio feature sequence is generated by combining the audio features corresponding to the audio frames. The audio features are used for representing semantic features of the audio frames. The audio features may be obtained from waveforms corresponding to the audio frames. By computing frequency, phase, amplitude, reciprocal of Mel-spectrum, and other features of the waveforms corresponding to the audio frames, the audio features corresponding to the audio frames may be obtained.

In some embodiments, as shown in FIG. 7, FIG. 7 exemplarily shows a schematic diagram of chunking of voice data. Assuming that the number of audio frames of input voice data 70 is 20 and that each chunk has four valid frames, eight historical frames, and four future frames, the input voice data 70 may be divided into five chunks, and the number of frames of each chunk is as follows: 8, 12, 16, 16, and 12, as shown in chunks 71, 72, 73, 74, and 75 in the figure. Chunk 71 has only four valid frames and four future frames. Chunk 72 has four historical frames, four valid frames, and four future frames. Both chunk 73 and chunk 74 have eight historical frames, four valid frames, and four future frames. Chunk 75 has eight historical frames and four valid frames. The chunks have an overlapping part. For example, the future frame part of chunk 71 overlaps the valid frame part of chunk 72, and the historical frame part of chunk 72 overlaps the valid frame part of chunk 71.

In the actual voice recognition process, in order to reduce the delay of the voice recognition process, audio frames of voice data are obtained in real time when obtaining the voice data. When the number of audio frames satisfies the number of audio frames of a chunk, the chunk is obtained. Similarly, when the number of audio frames satisfies the number of audio frames of a next chunk, the next chunk is obtained.

In some embodiments, it is assumed that the number of valid frames disposed in the chunk is 4, the number of historical frames is 8, and the number of future frames is 4. When the number of audio frames obtained is 8, a first chunk is obtained. The first chunk has four valid frames and four future frames. The first chunk is composed of frames 1-8. When the number of audio frames obtained on the basis of eight audio frames are obtained is 4, a second chunk is obtained. The second chunk has four historical frames, four valid frames, and four future frames. The second chunk is composed of frames 1-12. When the number of audio frames obtained on the basis of 12 audio frames are obtained is 4, a third chunk is obtained. The third chunk has eight historical frames, four valid frames, and four future frames. The third chunk is composed of frames 1-16. By analogy, the fourth chunk is composed of frames 5-20. The number of audio frames to be obtained by the first chunk is the number of valid frames disposed plus the number of future frames. The condition of obtaining subsequent chunks is that the number of audio frames to be obtained again is the number of valid frames disposed.

Step 620: Obtain an intermediate processing result for a historical chunk corresponding to the target chunk from data stored in a buffer region, and encode the audio feature sequence of the target chunk using the intermediate processing result for the historical chunk to obtain hidden layer features of the target chunk, the hidden layer features being encoded features of the target chunk. The historical chunk refers to an encoded chunk having at least one overlapping audio frame with the target chunk.

In some embodiments, the intermediate processing result for the historical chunk is: an intermediate quantity needed in the encoding process of the target chunk. As shown in FIG. 7, chunk 73 is used as a target chunk. When the target chunk 73 is processed, chunk 71 and chunk 72 have been processed at this moment. When the valid frame part of the target chunk 73 is encoded, it is necessary to consider both the historical frame part and the future frame part of the target chunk 73. At this moment, the historical frame part of the target chunk 73 is the valid frame part of chunk 71 and the valid frame part of chunk 72. At this moment, both chunk 71 and chunk 72 are historical chunks of the target chunk 73. Also, the valid frame parts of chunk 71 and chunk 72 have been processed. Therefore, the target chunk 73 may be encoded by directly using intermediate processing results for the valid frame parts of chunk 71 and chunk 72.

The hidden layer feature sequence is the result of encoding the audio feature sequence corresponding to the voice data. The encoding process is to encode the valid frame part in the chunks divided by the audio data, and encode the valid frame part based on the historical frame, the valid frame, and the future frame in the target chunk to obtain hidden layer features corresponding to the valid frame. The encoded hidden layer features corresponding to the valid frames of the target chunks are combined to generate the hidden layer feature sequence.

The hidden layer features correspond to the audio features. The audio features are features of non-encoded audio frames, while the hidden layer features are features of encoded audio frames.

In some embodiments, as shown in FIG. 7, the voice data is encoded. First, chunk 71 is encoded. Based on the four valid frames and the four future frames of chunk 71, hidden layer features corresponding to the four valid frames in chunk 71 are obtained. Next, chunk 72 is encoded. Based on the four historical frames, the four valid frames, and the four future frames of chunk 72, hidden layer features corresponding to the four valid frames in chunk 72 are obtained. When chunk 72 is a target chunk, the four historical frames of the target chunk 72 are the valid frame part of chunk 71. That is, chunk 71 is a historical chunk of the target chunk 72.

When computing results for the four valid frames of chunk 71 have been obtained, the four audio frames are not required to be repeatedly computed when the target chunk 72 is encoded. Similarly, the same operation is performed for chunk 73, 74, and 75, and will not be repeated herein.

In some embodiments, the number of the valid frames and the number of the future frames are determined based on a delay requirement of a current voice recognition scenario.

The delay is used for representing the delay of the voice recognition scenario. The delay includes a first word delay and a last word delay. The first word delay represents time required for a user to input the voice data to obtain a first recognition word. The last word delay represents time required for the user to input the voice data to obtain a last recognition word. The real-time rate is the computing result obtained by dividing the time required to process a piece of voice data by the time of the voice data. The real-time rate represents the decoding and recognition speed. As the real-time rate is smaller, the decoding and recognition speed is higher, and the corresponding delay is smaller accordingly. For example, if it takes 8 hours to process audio lasting for 2 hours, the real-time rate is 8/2=4. According to the experimental evaluation, the real-time voice recognition model in this disclosure has a delay of less than 500 ms and a decoding real-time rate of about 0.5, and achieves a high recognition accuracy.

In the encoding process, by multiplexing an intermediate computing result for a historical chunk, it is unnecessary to repeatedly compute audio frames in the historical chunk, thereby saving time required for computing historical frames in a target chunk. Therefore, in the recognition process of the target chunk, when the number of audio frames obtained by an object satisfies the total number of historical frames, valid frames and future frames, a first target chunk is obtained, and the target chunk is recognized to obtain a corresponding recognition result which is displayed in a client of the object. By adjusting the number of future frames, the total number of historical frames, valid frames and future frames is adjusted, which is equivalent to adjusting the time required to obtain the first target chunk and the time required for the object to view part of the real-time voice recognition results in the client.

By adjusting the number of valid frames and future frames, the time required to display part of the real-time voice recognition results in the client is controlled. The number of valid frames and future frames may be adjusted according to the requirements of the object, thereby increasing the diversity and flexibility of a real-time voice recognition function.

Step 630: Decode to obtain a real-time voice recognition result for the target chunk according to the hidden layer features.

In some embodiments, predicted recognition results are obtained by decoding the hidden layer features based on the encoded hidden layer features.

In this embodiment of this disclosure, voice data is divided into a plurality of chunks. When the current target chunk is encoded, intermediate processing results for (a) previous historical chunk(s) of the target chunk are multiplexed, thereby reducing the amount of computation in the encoding process, increasing the speed of voice recognition, and better meeting the requirement of real-time voice recognition.

FIG. 8 shows a flow chart of a real-time voice recognition method according to some other embodiments of this disclosure. The executive entity of the method may be the model using device 20 in the scheme implementation environment shown in FIG. 1. The method may include at least one of the following steps (810-840):

Step 810: Obtain an audio feature sequence of a target chunk of voice data, the target chunk including at least two consecutive audio frames in the voice data, and the audio feature sequence of the target chunk including audio features of the audio frames contained in the target chunk.

Step 820: Obtain an intermediate processing result for a historical chunk from data stored in a buffer region.

The buffer region is a region for storing the intermediate processing result for the historical chunk, and the buffer region stores a valid frame computing result corresponding to the historical chunk of the target chunk. In some embodiments, the number of valid frame computing results stored in the buffer region is the same as the number of historical frames disposed.

Step 830: Encode the audio feature sequence of the target chunk by an encoder of a real-time voice recognition model using the intermediate processing result for the historical chunk to obtain hidden layer features of the target chunk.

The real-time voice recognition model is a model for real-time voice recognition of voice data, and the structure of the real-time voice recognition model is described in the following embodiments. For example, the real-time voice recognition model may be a model constructed based on a neural network. In some embodiments, the real-time voice recognition model includes an encoder (or an encoding network) and a decoder (or a decoding network). The encoder is configured to encode input audio features to obtain hidden layer features. The decoder is configured to decode the hidden layer features to obtain a voice recognition result.

The server ASR decoding part shown in FIG. 5 refers to the complete flow of the server performing the real-time voice recognition method according to this embodiment of this disclosure, for example, obtaining an audio feature sequence of a target chunk of voice data, then encoding the audio feature sequence of the target chunk by the encoder of the real-time voice recognition model according to a processing result for a historical chunk corresponding to the target chunk to obtain hidden layer features of the target chunk, and then decoding to obtain a real-time voice recognition result of the target chunk by a CTC-WFST decoder of the server according to the hidden layer features.

When the real-time voice recognition model encodes the target chunk, the intermediate processing result for the historical chunk in the buffer region may be used for assisting in encoding subsequent target chunks. Further, when an intermediate computing result for the valid frame obtained by the latest computation is obtained, an intermediate computing result for the valid frame stored relatively early in the buffer region is overwritten.

In some embodiments, referring to FIG. 7, the voice data is encoded. First, chunk 71 is encoded. At this moment, chunk 71 is a target chunk. Based on the four valid frames and the four future frames of the target chunk 71, hidden layer features corresponding to the four valid frames in the target chunk 71 are obtained, and intermediate computing results corresponding to the four valid frames are stored in the buffer region. In some embodiments, the intermediate computing results may be K and V vectors computed by the multi-head self attention module of each encoding layer and convolution results computed by the convolution module. Next, chunk 72 is encoded. Based on the four historical frames, the four valid frames, and the four future frames of the target chunk 72, hidden layer features corresponding to the four valid frames in the target chunk 72 are obtained.

When chunk 72 is a target chunk, the four historical frames of the target chunk 72 are the valid frame part of chunk 71. That is, chunk 71 is a historical chunk of the target chunk 72. At this moment, the intermediate computing results corresponding to the four valid frames may be obtained from the buffer region, and the four audio frames are not required to be computed again.

Step 840: Decode to obtain a real-time voice recognition result for the target chunk according to the hidden layer features.

Step 810 and step 840 have been described in the above embodiments and will not be repeated herein.

In some embodiments, the encoder includes n encoding layers in series, where n is an integer greater than 1. The encoding layer includes a multi-head self attention module and a convolution module. The multi-head self attention module is configured to process an input feature sequence using a multi-head self attention mechanism. The convolution module is configured to convolve the input feature sequence. Correspondingly, the buffer region includes a first buffer region and a second buffer region. The first buffer region is configured to store an intermediate processing result of the multi-head self attention module for the historical chunk. The second buffer region is configured to store an intermediate processing result of the convolution module for the historical chunk.

The first buffer region and the second buffer region have the same function to store output results for the modules. The difference is that the first buffer region stores an intermediate processing result in the multi-head self attention module, and the second buffer region stores an intermediate processing result in the convolution module.

In some embodiments, the encoding layer further includes a first feed forward module, a second feed forward module, and a layer normalization module. The first feed forward module (FFM) is configured to feed forward the input feature sequence to obtain a first intermediate feature sequence. The multi-head self attention module (MHSA) is configured to process the first intermediate feature sequence using a multi-head self attention mechanism to obtain a second intermediate feature sequence. The convolution module is configured to convolve the second intermediate feature sequence to obtain a third intermediate feature sequence. The second feed forward module is the same as the first feed forward module, and is configured to feed forward the third intermediate feature sequence to obtain a fourth intermediate feature sequence. The layer normalization module (Layernorm) is configured to normalize the fourth intermediate feature sequence to obtain the output feature sequence.

In some embodiments, as shown in FIG. 9, FIG. 9 exemplarily shows a structural diagram of a Conformer network. Conformer first pre-processes an input feature sequence, including a data enhancement module (SqecAug) 910, a convolution subsampling module 920, an arrangement module (Linear) 930, and a dropout module 940, to obtain a pre-processed feature sequence. The feature sequence is then inputted into an encoding module 950 for encoding. The encoding module 950 has a plurality of encoding layers with the same structure. In some embodiments, the encoding layers may have different structures. In this embodiment, the encoding layers have the same structure as shown in the structural diagram in region 960 in FIG. 9. As shown in region 960, the encoding layer is composed of: a first feed forward module 961, a multi-head self attention module 962, a convolution module 963, a second feed forward module 964, and a layer normalization module

965. Each module is described in the following embodiments. The number of encoding layers in the encoding module 950 may be 4 or 6, which is not limited in this disclosure. An output result of the first feed forward module 961 is a first intermediate feature sequence. The first intermediate feature sequence is inputted to the multi-head self attention module 962 to obtain a second intermediate feature sequence. The second intermediate feature sequence is inputted to the convolution module 963 to obtain a third intermediate feature sequence. The third intermediate feature sequence is inputted to the second feed forward module 964 to obtain a fourth intermediate feature sequence. The fourth intermediate feature sequence is inputted to the layer normalization module 965 to obtain an output feature sequence. The computing formula is as follows:

$$\tilde{x}_1 = x_i + \frac{1}{2}\mathrm{FFN}(x_i)$$

$$x'_i = \tilde{x}_1 + \mathrm{MHSA}(\tilde{x}_1)$$

$$x''_i = x'_i + \mathrm{Conv}(x'_i)$$

$$y_i = \mathrm{Layernorm}(x''_i + \frac{1}{2}\mathrm{FFN}(x''_i))$$

where FFN is the feed forward module, MHSA is the multi-head self attention module, Cony is the convolution module, and Layernorm is the layer normalization module.

Figure 10:
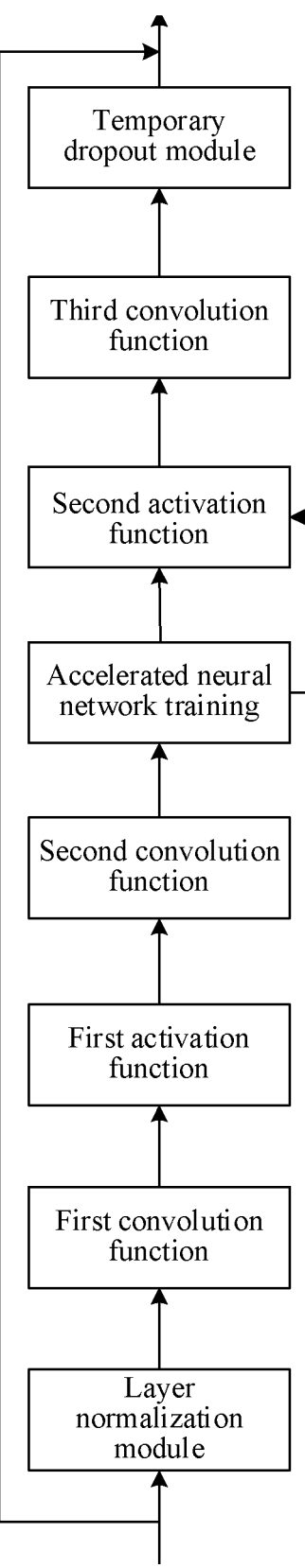
FIG. 10 is a schematic structural diagram of a convolution module according to some embodiments of this disclosure.

In some embodiments, as shown in FIG. 10, FIG. 10 exemplarily shows a schematic structural diagram of a convolution module. The convolution module has a multilayer structure, which is composed of a layer normalization module, three convolution modules, two activation function modules, and accelerated neural network training and temporary dropout modules. The first convolution module and the third convolution module are the same convolution module, and both are Pointwise convolution modules, which only change the number of feature graphs without changing the size of feature graphs. The second convolution module is a Depthwise convolution module, which changes the size of feature graphs without changing the number of channels.

Figure 11:
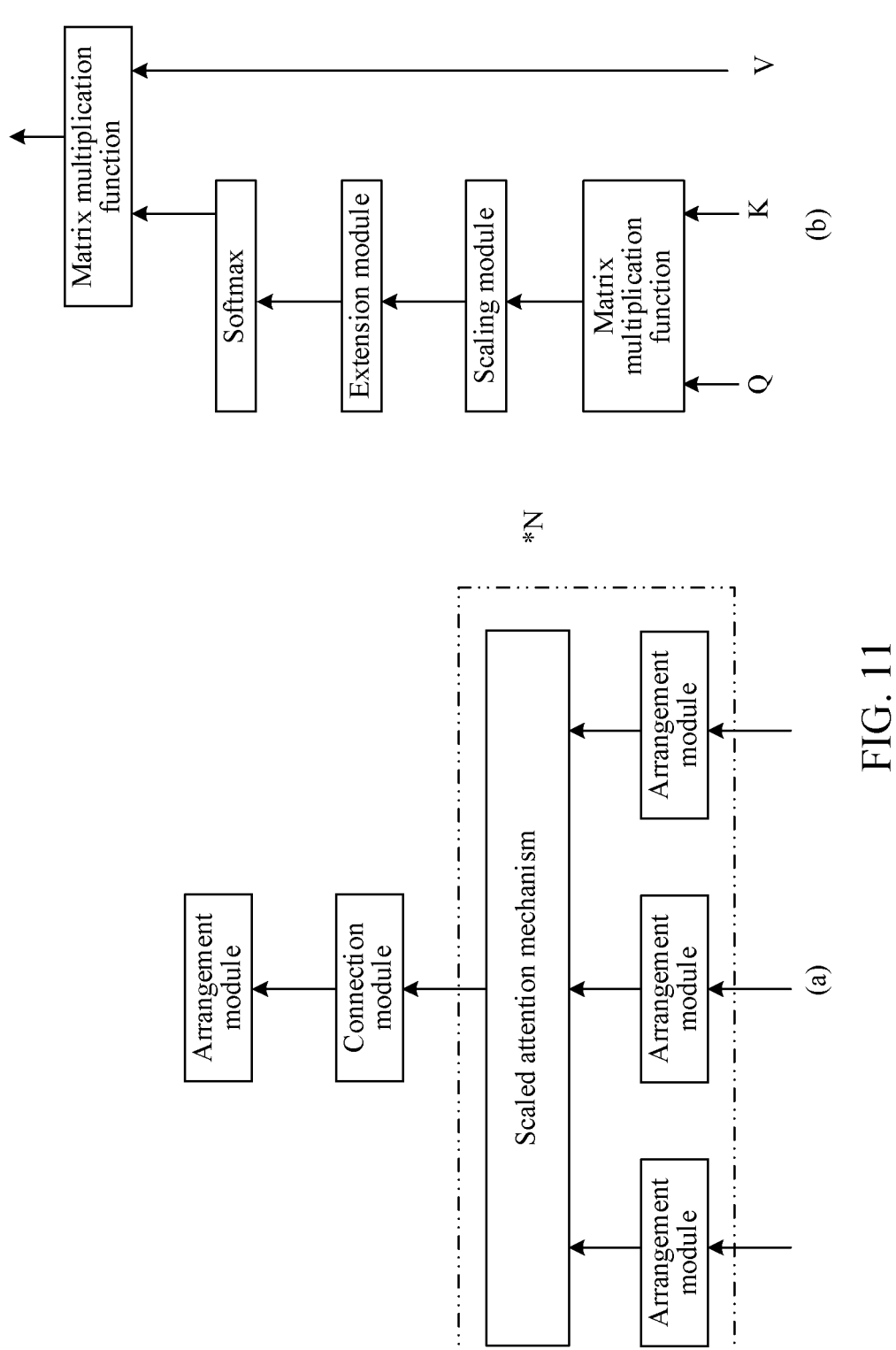
FIG. 11 is a schematic structural diagram of a multi-head self attention module according to some embodiments of this disclosure.

In some embodiments, as shown in FIG. 11, FIG. 11 exemplarily shows a schematic structural diagram of a multi-head self attention module. Part (a) of FIG. 11 is a schematic structural diagram of a multi-head self attention module. Part (b) of FIG. 11 is an expanded structure diagram of a scaled attention mechanism in part (a). The computing method for the self attention mechanism is introduced below.

Figure 12:
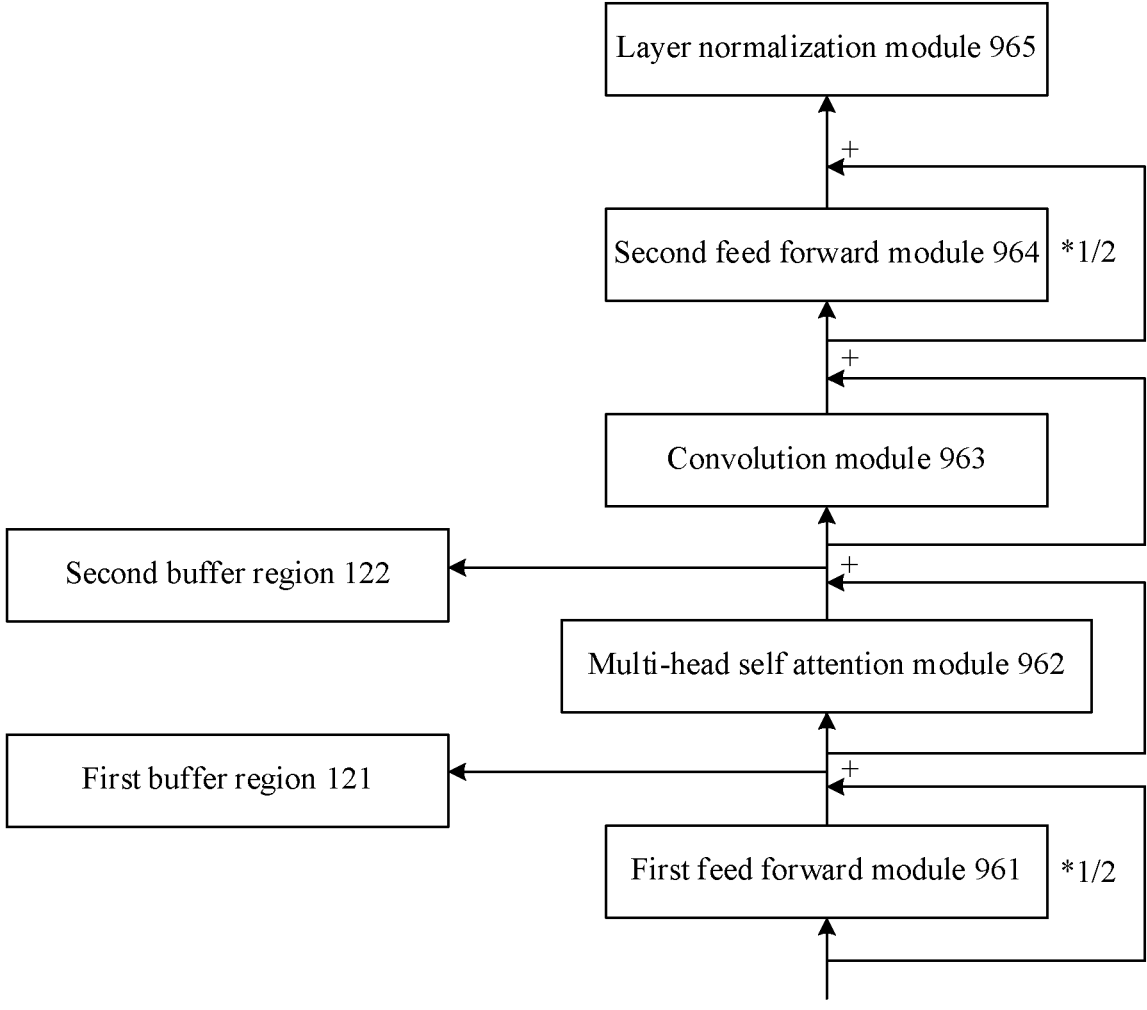
FIG. 12 is a schematic structural diagram of a Conformer added with a buffer region according to some embodiments of this disclosure.

In some embodiments, as shown in FIG. 12, FIG. 12 exemplarily shows a schematic structural diagram of Conformer added with a buffer region. In FIG. 12, the multi-head self attention module 962 and the convolution module 963 are added with buffer regions, the multi-head self attention module 962 is added with a first buffer region 121, and the convolution module 963 is added with a second buffer region 122.

Figure 13:
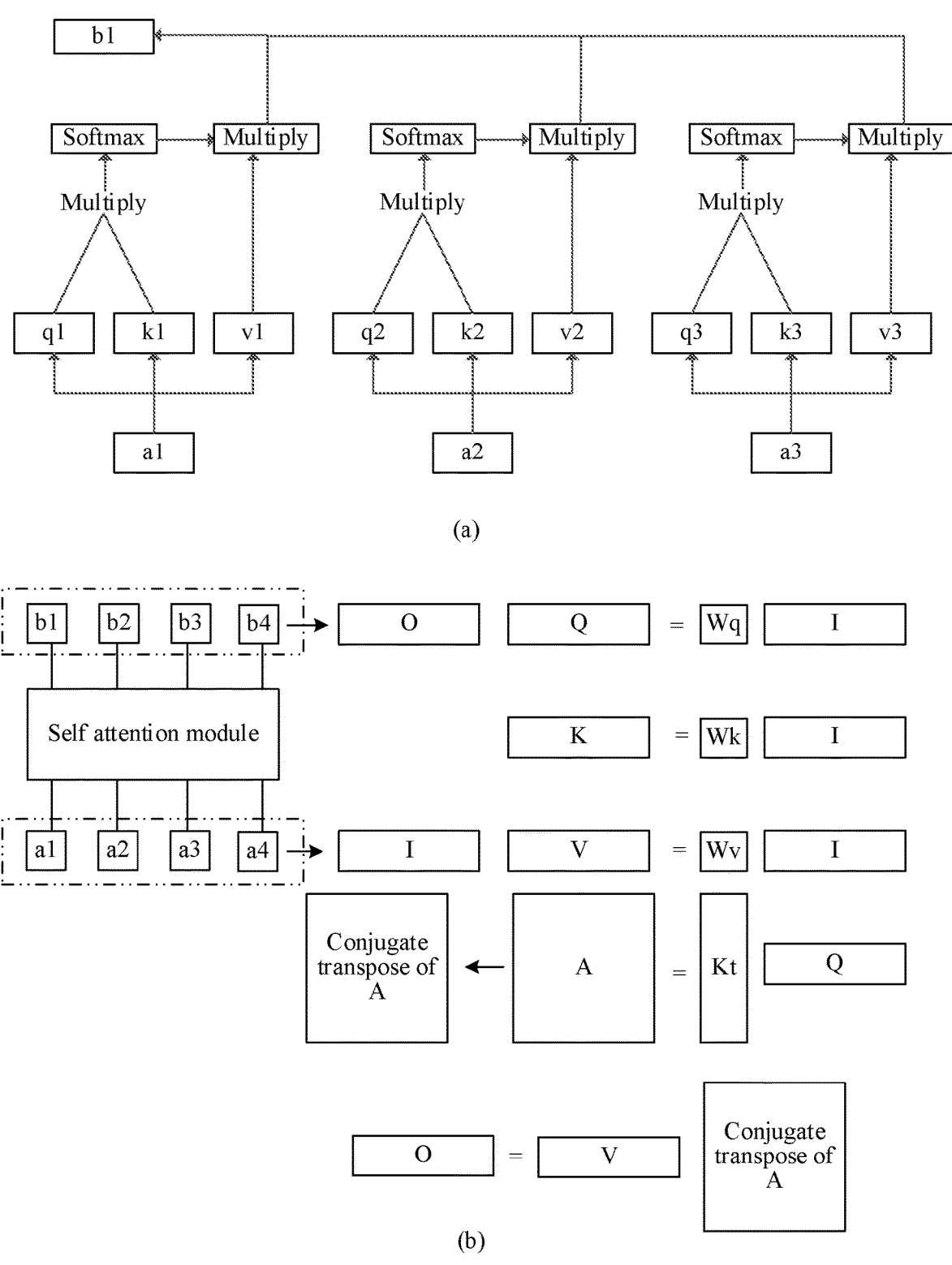
FIG. 13 is a schematic diagram of a computing method for a self attention mechanism according to some embodiments of this disclosure.

In some embodiments, as shown in FIG. 13, FIG. 13 exemplarily shows a schematic diagram of a computing method for a self attention mechanism. The attention mechanism is different from the encoding process, which is a process of finding the correlation between various inputs. Therefore, in this disclosure, a recognition result for a valid frame is predicted by obtaining the correlation between a historical frame or a future frame and the valid frame using the self attention mechanism.

First, as shown in FIG. 13, the first intermediate feature sequence of the historical frame or the future frame and the valid frame outputted by the first feed forward module is used as an input of the attention mechanism. A feed forward result for the historical frame is set to $a_1$, a feed forward result for the valid frame is set to $a_2$, and a feed forward result for the future frame is set to $a_3$.

Then, the vectors $a_1$, $a_2$, and $a_3$ are multiplied by three different embedded transformation matrices $W_q$, $W_k$, and $W_v$ respectively to obtain different vectors q, k, and v respectively. In the case of $\alpha_1$, three vectors $q_1$, $k_1$, and $v_1$ may be obtained. q represents a query vector, k represents a key vector, and v represents an information extraction vector.

Then, in the case of $\alpha_1$, multiplication of vector $q_1$ by vector $k_1$ is a process of attention matching. In order to prevent the value from being too large, the normalization process is required. After multiplying vector $q_1$ by vector $k_1$, the product is divided by $\sqrt{d}$ to obtain $\alpha_{1.1}$. By parity of reasoning, $\alpha_{1.2}$ and $\alpha_{1.3}$ may be obtained. d is the dimension of q and k, and the dimension is usually understood as: "a point is 0-dimensional, a line is 1-dimensional, a plane is 2-dimensional, and a body is 3-dimensional". Through this process, an inner product vector $\alpha_{1.i}$ may be obtained.

Second, a softmax function operation is performed on the inner product vector $\alpha_{1.i}$ obtained, and a softmax function value of this element is the ratio of an index of this element to the sum of indexes of all elements. In the case of $\alpha_{1.1}$, the softmax function operation is to divide the index of $\alpha_{1.1}$ by the sum of the index of $\alpha_{1.1}$, the index of $\alpha_{1.2}$, and the index of $\alpha_{1.3}$. $\hat{\alpha}_{1.1}$ is the value of $\alpha_{1.i}$ after the softmax function operation.

Then, $\hat{\alpha}_{1.i}$ obtained is multiplied by $v_i$. Specifically, $\hat{\alpha}_{1.1}$ is multiplied by $v_1$, $\hat{\alpha}_{1.2}$ is multiplied by $v_2$, $\hat{\alpha}_{1.3}$ is multiplied by $v_3$, and the results obtained are summed to obtain $b_1$, where $b_1$ is the final output result. By parity of reasoning, $b_2$ and $b_3$ may be obtained. $b_1$ is the second intermediate feature sequence between the historical frame and the valid frame, and $b_3$ is the second intermediate feature sequence between the future frame and the valid frame.

In some embodiments, the convolution module is configured to convolve second intermediate features of a current frame and second intermediate features of at least one historical frame of the current frame to obtain third intermediate features of the current frame.

In order to reduce the style in the voice recognition process, the convolution module in Conformer uses causal convolution. If the number of convolution kernels is 15, it is necessary to use historical 14 frames and the current frame to predict the convolution output of the current frame.

The buffering mechanism is designed as follows: before computing the convolution module, each chunk buffers the last 14 frames of the Nc part of the valid frame of the current chunk, and before computing the convolution module, the next chunk uses this buffer part as the historical frame.

In some embodiments, as shown in FIG. 14, part L in FIG. 14 is a self attention computation intermediate result buffered in the previous chunk. It is obvious that the Query dimension is C and the Key dimension is L+C when each chunk computes the second intermediate feature sequence. In the multi-head self attention mechanism, C of the Key dimension and C of the Query dimension are homologous and are both computed in the current chunk. However, L is not computed in the current chunk, but the intermediate result buffered in the first buffer region when the previous chunk is computed is multiplexed, and L is generally n times of C.

In this embodiment of this disclosure, the first buffer region and the second buffer region are provided to store the intermediate computing result for the computed chunk and apply the intermediate computing result to the subsequent computation. By multiplexing the intermediate computing result, the amount of computation is reduced, and the time of computation is saved.

In addition, by not convolving the future frame in the convolution module, the amount of computation is reduced, the time of computation is saved, and the delay of the voice recognition process is reduced.

FIG. 15 shows a flow chart of a method for training a real-time voice recognition model according to some embodiments of this disclosure. The executive entity of the method may be the model training device 10 in the scheme implementation environment shown in FIG. 1. The method may include at least one of the following steps (1510-1540):

Step 1510: Obtain an audio feature sequence of sample voice data, the audio feature sequence including audio features of a plurality of audio frames of the sample voice data.

The sample voice data is voice data for training the real-time voice recognition model. The sample voice data corresponds to a real recognition result. The real recognition result is an accurate recognition result to be expressed by the sample voice data.

Sample voice data is obtained, and the sample voice data is framed by time to obtain a plurality of audio frames. Audio features of each frame are obtained and integrated to obtain an audio feature sequence of the sample voice data.

Step 1520: Input the audio feature sequence to an encoder of the real-time voice recognition model, chunk the audio feature sequence by the encoder according to a mask matrix, and encode each chunk to obtain a hidden layer feature sequence of the sample voice data, the hidden layer feature sequence including hidden layer features of each chunk. Each chunk includes at least two consecutive audio frames among the plurality of audio frames, and at least one overlapping audio frame is present between two adjacent chunks. The encoder encodes a current chunk using an intermediate processing result, stored in a buffer region, for at least one historical chunk having an overlapping audio frame with the current chunk. The historical chunk refers to an encoded chunk having at least one overlapping audio frame with a target chunk.

The current chunk is a target chunk which is being encoded, and the historical chunk is an encoded chunk. When there is an overlapping part between the current chunk and the historical chunk (the overlapping part is an overlapping partial audio frame), the intermediate processing result for the historical chunk may be multiplexed to assist in encoding the current chunk.

Different from the model using process, in the model training process, the whole audio feature sequence is inputted into the encoder instead of obtaining the target chunk in real time. For example, when the sample voice data has 10 frames, all the 10 frames are inputted into the encoder. For example, when the sample voice data has 20 frames, all the 20 frames are inputted into the encoder. In the encoder, the audio feature sequence is chunked to generate a plurality of chunks. Each chunk is encoded to obtain hidden layer features corresponding to the valid frame part of each chunk. Similarly, since the chunks are overlapping, the computing result for the valid frame part in the historical chunk may be multiplexed when the subsequent target chunk is encoded as in the foregoing embodiments, thus saving the time of computation.

In some embodiments, the encoder determines frames contained in each chunk according to a mask matrix. The mask matrix includes a plurality of groups of elements. Each group of elements is used for indicating audio frames contained in a chunk. Audio frames contained and not contained in a chunk are distinguished by two different values in each group of elements.

Figure 16:
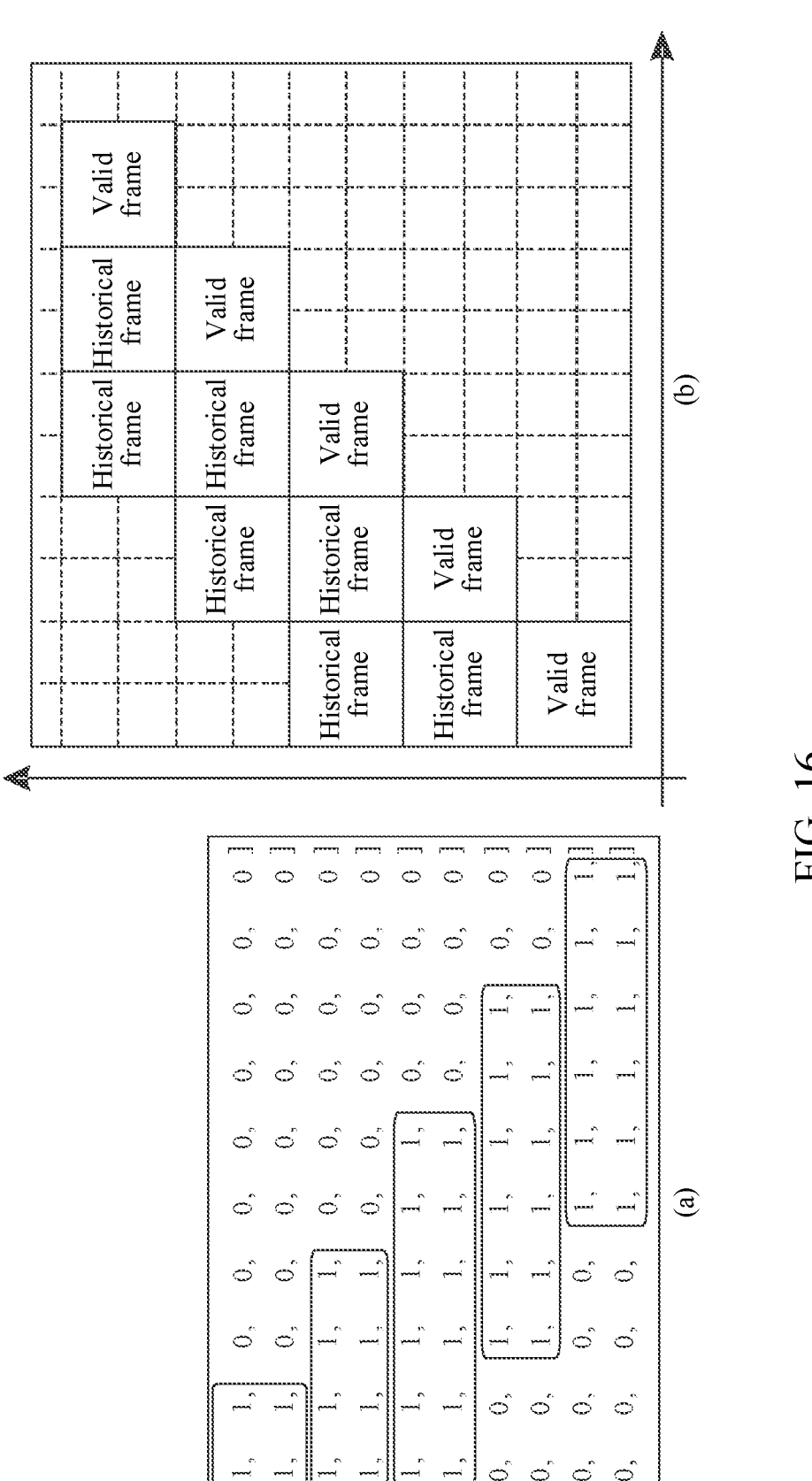
FIG. 16 is a schematic diagram of division based on a mask matrix according to some embodiments of this disclosure.

When the encoder uses a Transformer or Conformer structure, the Transformer or Conformer structure has a multi-head self attention module. In the multi-head self attention module, the voice data is chunked by the mask matrix. As shown in FIG. 16, FIG. 16 exemplarily shows a schematic diagram of chunking via a mask matrix. FIG. 16 only shows valid frame and historical frame parts of a chunk. The number of valid frames of the chunk is 2, and the number of historical frames is 4. As shown in part (a) in FIG. 16, 1 represents an audio frame on which the mask matrix focuses, and 0 represents an audio frame on which the mask matrix does not focus. Each solid line box represents each chunk, where the valid frame part includes 1, 1, 1, 1 on the right side of each chunk, and the remaining parts are the historical frame part. As shown in part (b) in FIG. 16, the vertical axis of the mask matrix represents a Query (Q) direction, and the horizontal axis represents a Key (K) direction. A specific computing formula for the multi-head self attention module is as follows:

$$\text{Attention}(Q, K, V) = \text{softmax}\left(\frac{QK^T}{\sqrt{d_k}}\right)V$$

$$\text{MultiHead}(Q, K, V) = \text{Concat}(\text{head}_1, \ldots, \text{head}_h)W^o$$

$$\text{head}_i = \text{Attention}(QW_1^Q, KW_i^K, VW_i^V)$$

FIG. 16 describes matrix computation of QK^T, where Q is an m×n-dimensional matrix, k is a k×n-dimensional matrix, T represents the transpose of the matrix, and the computing result of the matrix QK^T is an m×k-dimensional matrix, which describes an association coefficient (degree) between each frame of Query and each frame of Key.

In some embodiments, the encoder includes n encoding layers in series, where n is an integer greater than 1. In step 1520, the process of inputting the audio feature sequence to an encoder of the real-time voice recognition model and chunking the audio feature sequence by the encoder according to a mask matrix includes: determining chunks corresponding to a first encoding layer according to the mask matrix, including: at least one valid frame, at least one historical frame preceding the valid frame, and at least one future frame following the valid frame; and determining chunks corresponding to an $i^{th}$ encoding layer according to the mask matrix, including: at least one valid frame and at least one historical frame preceding the valid frame, i being an integer greater than 1 and less than or equal to n.

The encoding each chunk to obtain a hidden layer feature sequence of the sample voice data includes:

inputting the audio feature sequence to a first encoding layer of the encoder, and encoding the audio feature sequence through the first encoding layer to obtain an output feature sequence of the first encoding layer; and inputting an output feature sequence of an $(i-1)^{th}$ encoding layer relative to an $i^{th}$ encoding layer of the encoder to the $i^{th}$ encoding layer, and encoding the output feature sequence of the $(i-1)^{th}$ encoding layer through the $i^{th}$ encoding layer to obtain an output feature sequence of the $i^{th}$ encoding layer. The $i^{th}$ encoding layer encodes the current chunk by multiplexing output features of the at least one historical chunk in the $(i-1)^{th}$ encoding layer.

An output feature sequence of an $n^{th}$ encoding layer of the encoder is used as the hidden layer feature sequence.

For the model training stage, in the encoding process, the future frame is considered only when encoding the valid frame in the chunk of the first encoding layer, and only the historical frame and the valid frame of the chunk are encoded in the subsequent $i^{th}$ encoding layer. In the encoding process, if the future frames of chunks in all encoding layers are encoded, a large number of delays will be generated, and the delay will be much greater than Nc+n*Nr. If only the future frame of the chunk in the first encoding layer is encoded, the generated delay is only Nc+Nr, which is much smaller than the delay generated by the foregoing encoding method and reduces the delay of the real-time voice recognition system. Also, only the first layer of conformer focuses on the future frame, while other layers only focus on the limited historical frames and the current valid frame. Therefore, the delay of the voice recognition system may be controlled intuitively and flexibly.

In some embodiments, the encoding layer includes: a first feed forward module, a multi-head self attention module, a convolution module, a second feed forward module, and a layer normalization module.

The first feed forward module is configured to feed forward the input feature sequence to obtain a first intermediate feature sequence.

The multi-head self attention module is configured to process the first intermediate feature sequence using a multi-head self attention mechanism to obtain a second intermediate feature sequence.

The convolution module is configured to convolve the second intermediate feature sequence to obtain a third intermediate feature sequence.

The second feed forward module is configured to feed forward the third intermediate feature sequence to obtain a fourth intermediate feature sequence.

The layer normalization module is configured to normalize the fourth intermediate feature sequence to obtain the output feature sequence.

The Conformer encoding layer has been described in the above embodiments and will not be repeated herein.

In some embodiments, the convolution module is configured to convolve second intermediate features of a current frame and second intermediate features of at least one historical frame of the current frame to obtain third intermediate features of the current frame.

In order to reduce the style in the voice recognition process, the convolution module in Conformer uses causal convolution. If the number of convolutional system kernels is 15, it is necessary to use historical 14 frames and the current frame to predict the convolution output of the current frame.

Step 1530: Decode the hidden layer feature sequence by a decoder of the real-time voice recognition model to obtain a predicted recognition result for the sample voice data.

The hidden layer feature sequence is decoded by the decoder according to the hidden layer feature sequence to obtain the predicted recognition result for the sample voice data. In some embodiments, the encoder may be a Transformer encoder.

Step 1540: Train the real-time voice recognition model based on the predicted recognition result and a real recognition result of the sample voice data.

A training loss of the real-time voice recognition model is determined according to real text data and predicted text data, and network parameters of the real-time voice recognition model are adjusted based on the training loss. The training loss of the real-time voice recognition model is used for measuring the difference between the predicted recognition result and the real recognition result. In some embodiments, a gradient descent method is used for adjusting the model parameters based on the training loss, to finally obtain a trained real-time voice recognition model.

In this embodiment of this disclosure, the whole sentence of voice data is trained instead of being trained by chunking, and the voice data is chunked through a mask matrix, thereby increasing the model training speed, and improving the training efficiency of a voice recognition model. In addition, when a current chunk is encoded, the current chunk is encoded by using an intermediate processing result, stored in a buffer region, for at least one historical chunk having an overlapping audio frame with the current chunk, thereby reducing the amount and time of computation, further increasing the model training speed, and improving the training efficiency of a voice recognition model.

In addition, the training delay of the real-time voice recognition model is reduced by not encoding future frames in the second encoding layer and the subsequent encoding layers.

The following describes apparatus embodiments of this disclosure, which may be used for executing the method embodiments of this disclosure. Details not disclosed in the apparatus embodiments of this disclosure may be similar to those in the method embodiments of this disclosure.

Figure 17:
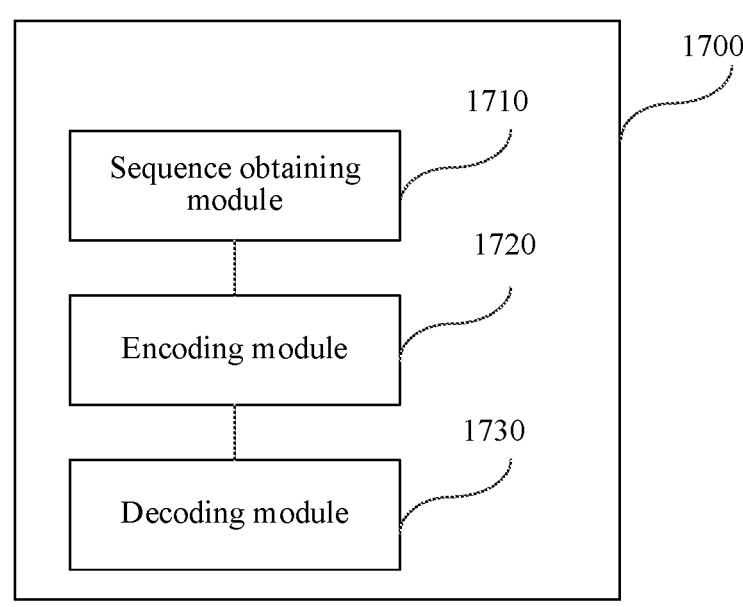
FIG. 17 is a block diagram of a real-time voice recognition apparatus according to some embodiments of this disclosure.

FIG. 17 shows a block diagram of a real-time voice recognition apparatus according to an embodiment of this disclosure. The apparatus has a function of performing the real-time voice recognition method, and the function may be implemented by hardware or may be implemented by hardware executing corresponding software. The apparatus may be a model using device as described above or may be disposed in the model using device. The apparatus 1700 may include: a sequence obtaining module 1710, an encoding module 1720, and a decoding module 1730.

The sequence obtaining module 1710 is configured to obtain an audio feature sequence of a target chunk of voice data. The target chunk includes at least two consecutive audio frames in the voice data. The audio feature sequence of the target chunk includes audio features of the audio frames contained in the target chunk.

The encoding module 1720 is configured to obtain an intermediate processing result for a historical chunk corresponding to the target chunk from data stored in a buffer region, and encode the audio feature sequence of the target chunk using the intermediate processing result for the historical chunk to obtain hidden layer features of the target chunk. The hidden layer features are encoded features of the target chunk. The historical chunk refers to an encoded chunk having at least one overlapping audio frame with the target chunk.

The decoding module 1730 is configured to decode to obtain a real-time voice recognition result for the target chunk according to the hidden layer features.

In some embodiments, an encoder includes n encoding layers in series, where n is an integer greater than 1.

The encoding layer includes a multi-head self attention module and a convolution module. The multi-head self attention module is configured to process an input feature sequence using a multi-head self attention mechanism. The convolution module is configured to convolve the input feature sequence.

The buffer region includes a first buffer region and a second buffer region. The first buffer region is configured to store an intermediate processing result of the multi-head self attention module for the historical chunk. The second buffer region is configured to store an intermediate processing result of the convolution module for the historical chunk.

Figure 18:
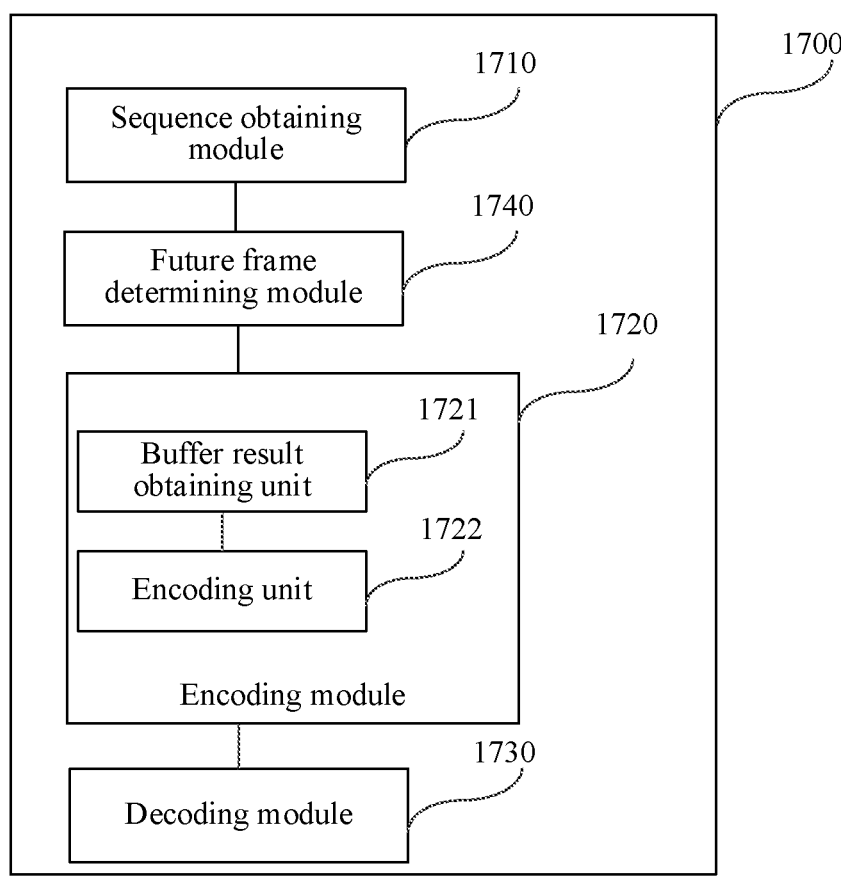
FIG. 18 is a block diagram of a real-time voice recognition apparatus according to other embodiments of this disclosure.

In some embodiments, the target chunk includes at least one valid frame and at least one historical frame preceding the valid frame. The at least one historical frame is an audio frame overlapping between the target chunk and the historical chunk. As shown in FIG. 18, the encoding module 1720 includes: a buffer result obtaining unit 1721 and an encoding unit 1722.

The buffer result obtaining unit 1721 is configured to obtain the intermediate processing result of the multi-head self attention module for the historical chunk from data stored in the first buffer region, and obtain the intermediate processing result of the convolution module for the historical chunk from the second buffer region.

The encoding unit 1722 is configured to encode, according to the intermediate processing results obtained from the first buffer region and the second buffer region, audio features of the at least one valid frame of the target chunk through the encoder of a real-time voice recognition model to obtain hidden layer features of the valid frame as hidden layer features of the target chunk.

In some embodiments, the encoding layer further includes a first feed forward module, a second feed forward module, and a layer normalization module.

The first feed forward module is configured to feed forward the input feature sequence to obtain a first intermediate feature sequence.

The multi-head self attention module is configured to process the first intermediate feature sequence using a multi-head self attention mechanism to obtain a second intermediate feature sequence.

The convolution module is configured to convolve the second intermediate feature sequence to obtain a third intermediate feature sequence.

The second feed forward module is configured to feed forward the third intermediate feature sequence to obtain a fourth intermediate feature sequence.

The layer normalization module is configured to normalize the fourth intermediate feature sequence to obtain the output feature sequence.

In some embodiments, the convolution module is configured to convolve second intermediate features of a current frame and second intermediate features of at least one historical frame of the current frame to obtain third intermediate features of the current frame.

In some embodiments, the target chunk further includes: at least one future frame following the valid frame.

In some embodiments, as shown in FIG. 18, the apparatus further includes: a future frame determining module 1740.

The future frame determining module 1740 is configured to determine the number of the future frames based on a delay requirement of a current voice recognition scenario.

In this embodiment of this disclosure, voice data is divided into a plurality of target chunks. When the target chunks are encoded, processing results for (a) previous historical chunk(s) of the target chunks are multiplexed, thereby reducing the amount of computation in the encoding process, increasing the speed of voice recognition, and better meeting the requirement of real-time voice recognition.

Figure 19:
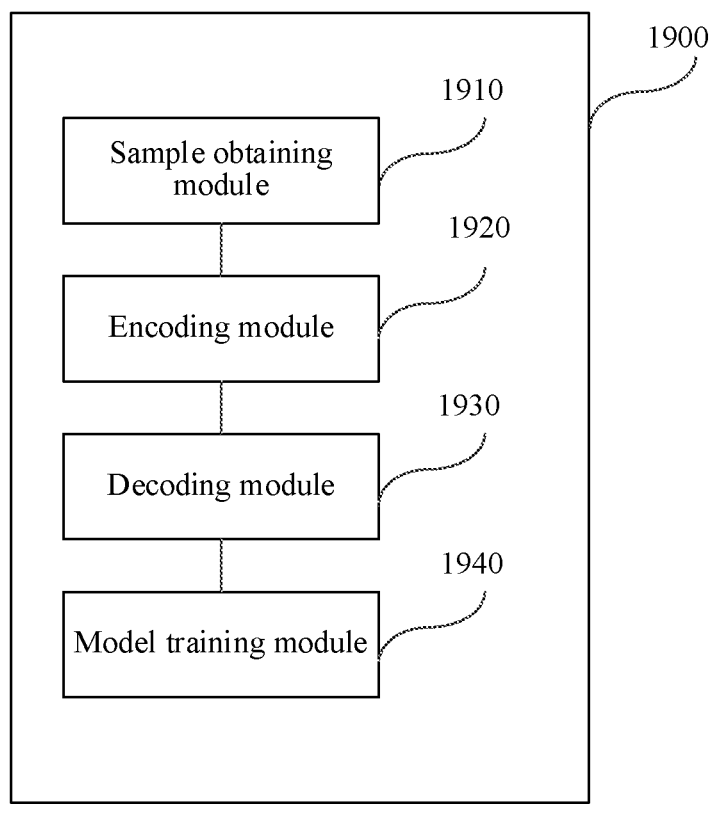
FIG. 19 is a block diagram of an apparatus for training a real-time voice recognition model according to some embodiments of this disclosure.

FIG. 19 shows a block diagram of an apparatus for training a real-time voice recognition model according to an embodiment of this disclosure. The apparatus has a function of performing the method for training a real-time voice recognition model, and the function may be implemented by hardware or may be implemented by hardware executing corresponding software. The apparatus may be a model training device as described above or may be disposed in the model training device. The apparatus 1900 may include: a sample obtaining module 1910, an encoding module 1920, a decoding module 1930, and a model training module 1940.

The sample obtaining module 1910 is configured to obtain an audio feature sequence of sample voice data. The audio feature sequence includes audio features of a plurality of audio frames of the sample voice data.

The encoding module 1920 is configured to input the audio feature sequence to an encoder of the real-time voice recognition model, chunk the audio feature sequence by the encoder according to a mask matrix, and encode each chunk to obtain a hidden layer feature sequence of the sample voice data. The hidden layer feature sequence includes hidden layer features of each chunk. Each chunk includes at least two consecutive audio frames among the plurality of audio frames, and at least one overlapping audio frame is present between two adjacent chunks. The encoder encodes a current chunk using a processing result, stored in a buffer region, for at least one historical chunk having an overlapping audio frame with the current chunk. The historical chunk refers to an encoded chunk having at least one overlapping audio frame with a target chunk.

The decoding module 1930 is configured to decode the hidden layer feature sequence by a decoder of the real-time voice recognition model to obtain a predicted recognition result for the sample voice data.

The model training module 1940 is configured to train the real-time voice recognition model based on the predicted recognition result and a real recognition result of the sample voice data.

In some embodiments, the mask matrix includes a plurality of groups of elements. Each group of elements is used for indicating audio frames contained in a chunk, and audio frames contained and not contained in a chunk are distinguished by two different values in each group of elements.

In some embodiments, the encoder includes n encoding layers in series, where n is an integer greater than 1. Each encoding layer among the n encoding layers includes a multi-head self attention module.

Audio frames which do not belong to the current chunk are masked by the mask matrix when the multi-head self attention module computes a multi-head self attention coefficient.

In some embodiments, the encoder includes n encoding layers in series, where n is an integer greater than 1. The encoding module 1920 is configured to:

determine chunks corresponding to a first encoding layer according to the mask matrix, including: at least one valid frame, at least one historical frame preceding the valid frame, and at least one future frame following the valid frame; and determine chunks corresponding to an $i^{th}$ encoding layer according to the mask matrix, including: at least one valid frame and at least one historical frame preceding the valid frame, i being an integer greater than 1 and less than or equal to n.

In some embodiments, the encoding module 1920 is further configured to:

input the audio feature sequence to a first encoding layer of the encoder, and encode the audio feature sequence through the first encoding layer to obtain an output feature sequence of the first encoding layer; and input an output feature sequence of an (i−1) t encoding layer relative to an $i^{th}$ encoding layer of the encoder to the $i^{th}$ encoding layer, and encode the output feature sequence of the $(i-1)^{th}$ encoding layer through the $i^{th}$ encoding layer to obtain an output feature sequence of the $i^{th}$ encoding layer. The $i^{th}$ encoding layer encodes the current chunk using output features, stored in the buffer region, of the at least one historical chunk in the $(i-1)^{th}$ encoding layer.

An output feature sequence of an $n^{th}$ encoding layer of the encoder is used as the hidden layer feature sequence.

In some embodiments, the encoding layer includes: a first feed forward module, a multi-head self attention module, a convolution module, a second feed forward module, and a layer normalization module.

The first feed forward module is configured to feed forward the input feature sequence to obtain a first intermediate feature sequence.

The multi-head self attention module is configured to process the first intermediate feature sequence using a multi-head self attention mechanism to obtain a second intermediate feature sequence.

The convolution module is configured to convolve the second intermediate feature sequence to obtain a third intermediate feature sequence.

The second feed forward module is configured to feed forward the third intermediate feature sequence to obtain a fourth intermediate feature sequence.

The layer normalization module is configured to normalize the fourth intermediate feature sequence to obtain the output feature sequence.

In some embodiments, the convolution module is configured to convolve second intermediate features of a current frame and second intermediate features of at least one historical frame of the current frame to obtain third intermediate features of the current frame.

In this embodiment of this disclosure, when a current chunk is encoded, the current chunk is encoded by using an intermediate processing result, stored in a buffer region, for at least one historical chunk having an overlapping audio frame with the current chunk, thereby reducing the amount and time of computation, increasing the model training speed, and improving the training efficiency of a voice recognition model.

The apparatus provided in the foregoing embodiments is illustrated with an example of division of the foregoing function modules during the implementation of the functions thereof. In practical application, the foregoing functions may be allocated to and completed by different function modules according to requirements. That is, the internal structure of the device is divided into different function modules, so as to complete all or part of the functions described above. In addition, the apparatus provided in the foregoing embodiments and the method embodiments fall within the same conception. A specific implementation process is described in detail with reference to the method embodiments and will not be repeated herein.

Figure 20:
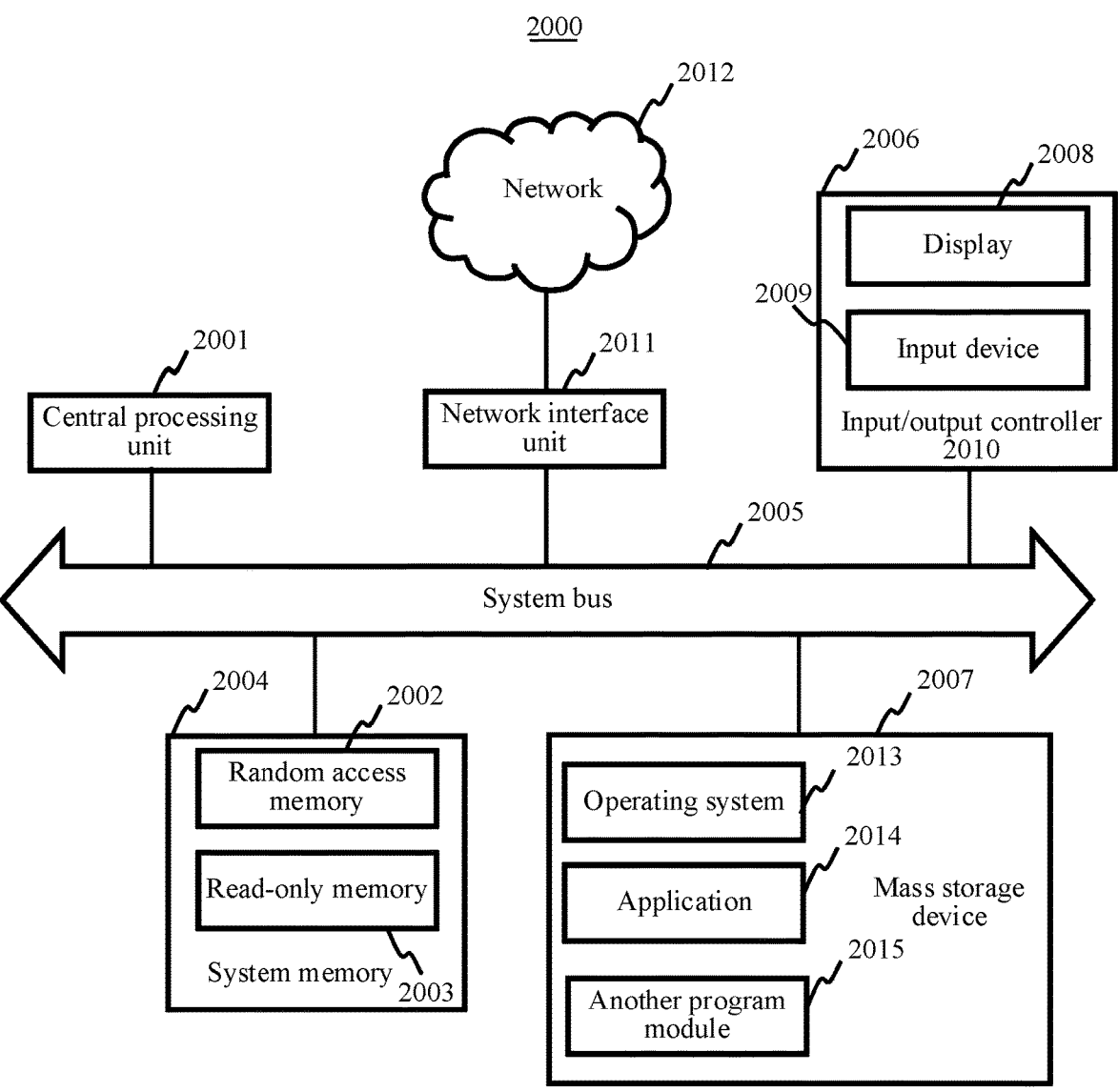
FIG. 20 is a schematic structural diagram of a computer device according to some embodiments of this disclosure.

FIG. 20 shows a schematic structural diagram of a computer device according to an embodiment of this disclosure. The computer device may be any electronic device with data computing, processing and storing functions, such as a mobile phone, a personal computer (PC), or a server. The computer device may be implemented as a model using device for implementing the real-time voice recognition method provided in the foregoing embodiments. Alternatively, the computer device may be implemented as a model training device for implementing the method for training a real-time voice recognition model provided in the foregoing embodiments. Specifically, the computer device 2000 includes a central processing unit (for example, a central processing unit (CPU), a graphics processing unit (GPU), and a field programmable gate array (FPGA)) 2001, a system memory 2004 including a random-access memory (RAM) 2002 and a read-only memory (ROM) 2003, and a system bus 2005 connecting the system memory 2004 and the central processing unit 2001. The computer device 2000 further includes a basic input output (I/O) system 2006 that facilitates transfer of information between components within a server, and a mass storage device 2007 that stores an operating system 2013, an application 2014, and another program module 2015.

The basic input output system 2006 includes a display 2008 for displaying information and an input device 2009 such as a mouse or a keyboard for inputting information by an object. The display 2008 and the input device 2009 are connected to the central processing unit 2001 through an input output controller 2010 which is connected to the system bus 2005. The basic input output system 2006 may further include the input output controller 2010 for receiving and processing input from a plurality of other devices, such as a keyboard, a mouse, or an electronic stylus. Similarly, the input output controller 2010 also provides output to a display screen, a printer, or another type of output device.

The large-capacity storage device 2007 is connected to the central processing unit 2001 by using a large-capacity storage controller (not shown) connected to the system bus 2005. The mass storage device 2007 and a computer-readable medium associated therewith provide non-volatile storage for the computer device 2000. That is, the mass storage device 2007 may include a computer-readable medium (not shown) such as a hard disk or a compact disc read-only memory (CD-ROM) drive.

In general, the computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable read-only memory (EPROM), an electrically erasable programmable read-only memory (EEPROM), a flash memory or another solid-state memory technology, a CD-ROM, a digital video disc (DVD) or another optical memory, a tape cartridge, a magnetic tape, a magnetic disk memory, or another magnetic storage device. Certainly, persons skilled in art can know that the computer storage medium is not limited to the foregoing several types. The foregoing system memory 2004 and mass storage device 2007 may be collectively referred to as a memory.

According to this embodiment of this disclosure, the computer device 2000 may further be connected, through a network such as the Internet, to a remote computer on the network and run. That is, the computer device 2000 may be connected to a network 2012 through a network interface unit 2011 which is connected to the system bus 2005, or may be connected to another type of network or remote computer system (not shown) by using the network interface unit 2011.

The memory further includes at least one instruction, at least one program, and a code set or instruction set. The at least one instruction, the at least one program, and the code set or instruction set are stored in the memory, and configured to be executed by one or more processors, to implement the real-time voice recognition method or the method for training a real-time voice recognition model.

In an exemplary embodiment, a computer-readable storage medium is further provided. The storage medium stores at least one instruction, at least one program, and a code set or instruction set. The at least one instruction, the at least one program, and the code set or instruction set, when executed by a processor of a computer device, implement the real-time voice recognition method or the method for training a real-time voice recognition model provided in the foregoing embodiments.

In some embodiments, the computer-readable storage medium may include: a read-only memory (ROM), a random-access memory (RAM), a solid state drive (SSD), an optical disc, or the like. The random access memory may include a resistance random access memory (ReRAM) and a dynamic random access memory (DRAM).

In an exemplary embodiment, a computer program product or a computer program is further provided. The computer program product or the computer program includes computer instructions. The computer instructions are stored in a computer-readable storage medium. A processor of a computer device reads the computer instructions from the computer-readable storage medium. The processor executes the computer instructions, whereby the computer device performs the real-time voice recognition method or the method for training a real-time voice recognition model.

It is to be understood that "plurality" mentioned in the specification means two or more. "And/or" describes an association relationship between associated objects, and represents that three relationships may exist. For example, A and/or B may represent the following three cases: only A exists, both A and B exist, and only B exists. The character "/" generally represents that contextual objects are in an "or" relationship. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this disclosure.

The above descriptions are merely exemplary embodiments of this disclosure, but are not intended to limit this disclosure. Any modification, equivalent replacement, or improvement made within the spirit and principle of this disclosure shall fall within the protection scope of this disclosure.

What is claimed is:

1. A method for training a real-time voice recognition model, the method comprising:

obtaining an audio feature sequence of sample voice data, the audio feature sequence comprising audio features of a plurality of audio frames of the sample voice data;

inputting the audio feature sequence to an encoder of the real-time voice recognition model;

chunking the audio feature sequence into a plurality of chunks by the encoder according to a mask matrix;

encoding each of the chunks to obtain a hidden layer feature sequence of the sample voice data, the hidden layer feature sequence comprising hidden layer features of each of the chunks, a chunk comprising at least two consecutive audio frames among the plurality of audio frames, at least one overlapping audio frame being present between two adjacent chunks, the encoder encoding a current chunk using an intermediate processing result, stored in a buffer region, for at least one historical chunk having an overlapping audio frame with the current chunk, and the historical chunk referring to an encoded chunk having at least one overlapping audio frame with a target chunk;

decoding the hidden layer feature sequence by a decoder of the real-time voice recognition model to obtain a predicted recognition result for the sample voice data; and training the real-time voice recognition model based on the predicted recognition result and a real recognition result of the sample voice data, wherein the encoder comprises n encoding layers in series, n being an integer greater than 1, and the chunking the audio feature sequence into the plurality of chunks comprises:

determining chunks corresponding to a first encoding layer according to the mask matrix, comprising: at least one valid frame, at least one historical frame preceding the valid frame, and at least one future frame following the valid frame; and determining chunks corresponding to an $i^{th}$ encoding layer according to the mask matrix, comprising: at least one valid frame and at least one historical frame preceding the valid frame, i being an integer greater than 1 and less than or equal to n, wherein a future frame following a valid frame is only used in determining chunks corresponding to the first encoding layer.

2. The method according to claim 1, wherein the mask matrix comprises a plurality of groups of elements, each group of elements being for indicating audio frames contained in a chunk, and audio frames contained and not contained in a chunk being distinguished by two different values in each of the groups of elements.

3. The method according to claim 1, wherein the encoder comprises n encoding layers in series, n being an integer greater than 1, each of the n encoding layers comprises a multi-head self attention module, and audio frames which do not belong to the current chunk are masked by the mask matrix when the multi-head self attention module computes a multi-head self attention coefficient.

4. The method according to claim 1, wherein the encoding each of the chunks to obtain the hidden layer feature sequence of the sample voice data comprises:

inputting the audio feature sequence to a first encoding layer of the encoder, and encoding the audio feature sequence through the first encoding layer to obtain an output feature sequence of the first encoding layer; and inputting an output feature sequence of an $(i-1)^{th}$ encoding layer relative to an $i^{th}$ encoding layer of the encoder to the $i^{th}$ encoding layer, and encoding the output feature sequence of the $(i-1)^{th}$ encoding layer through the $i^{th}$ encoding layer to obtain an output feature sequence of the $i^{th}$ encoding layer, the $i^{th}$ encoding layer encoding the current chunk using output features, stored in the buffer region, of the at least one historical chunk in the $(i-1)^{th}$ encoding layer, and an output feature sequence of an $n^{th}$ encoding layer of the encoder being used as the hidden layer feature sequence.

5. The method according to claim 1, wherein the method further comprises generating an output feature sequence, based on an input feature sequence, in each of the n encoding layers by:

feeding forward the input feature sequence to obtain a first intermediate feature sequence;

processing the first intermediate feature sequence using a multi-head self attention mechanism to obtain a second intermediate feature sequence;

convolving the second intermediate feature sequence to obtain a third intermediate feature sequence;

feeding forward the third intermediate feature sequence to obtain a fourth intermediate feature sequence; and normalizing the fourth intermediate feature sequence to obtain the output feature sequence.

6. The method according to claim 5, wherein the convolving the second intermediate feature sequence comprises:

convolving second intermediate features of a current frame and second intermediate features of at least one historical frame of the current frame to obtain third intermediate features of the current frame.

7. A real-time voice recognition method, performed by a computer device, the computer device being deployed with a real-time voice recognition model, the method comprising:

obtaining an audio feature sequence of a target chunk of voice data, the target chunk comprising at least two consecutive audio frames in the voice data, and the audio feature sequence of the target chunk comprising audio features of the audio frames contained in the target chunk;

obtaining an intermediate processing result for a historical chunk corresponding to the target chunk from data stored in a buffer region;

encoding the audio feature sequence of the target chunk using the intermediate processing result for the historical chunk to obtain hidden layer features of the target chunk, the hidden layer features being encoded features of the target chunk, and the historical chunk referring to an encoded chunk having at least one overlapping audio frame with the target chunk; and decoding to obtain a real-time voice recognition result for the target chunk according to the hidden layer features, wherein the real-time voice recognition model comprises an encoder, and the encoder comprises n encoding layers in series, n being an integer greater than 1, the method further comprises processing an input feature sequence in each of the n encoding layers by:

processing an input feature sequence using a multi-head self attention mechanism; and convolving the input feature sequence; and the buffer region comprises a first buffer region and a second buffer region, the first buffer region is configured to store an intermediate processing result of the multi-head self attention mechanism for the historical chunk, and the second buffer region is configured to store an intermediate processing result of the convolution for the historical chunk.

8. The method according to claim 7, wherein the target chunk comprises at least one valid frame and at least one historical frame preceding the valid frame, the at least one historical frame is an audio frame overlapping between the target chunk and the historical chunk, and the encoding the audio feature sequence of the target chunk using the intermediate processing result for the historical chunk comprises:

obtaining the intermediate processing result for the historical chunk from the first buffer region, obtaining the intermediate processing result for the historical chunk from the second buffer region; and encoding, according to the intermediate processing results obtained from the first buffer region and the second buffer region, audio features of the at least one valid frame of the target chunk to obtain hidden layer features of the valid frame as hidden layer features of the target chunk.

9. The method according to claim 7, wherein the method further comprises generating an output feature sequence, based on the input feature sequence, in each of the n encoding layers by:

feeding forward the input feature sequence to obtain a first intermediate feature sequence;

processing the first intermediate feature sequence using a multi-head self attention mechanism to obtain a second intermediate feature sequence;

convolving the second intermediate feature sequence to obtain a third intermediate feature sequence;

feed forwarding the third intermediate feature sequence to obtain a fourth intermediate feature sequence; and normalizing the fourth intermediate feature sequence to obtain the output feature sequence.

10. The method according to claim 9, wherein the convolving the second intermediate feature sequence comprises:

convolving second intermediate features of a current frame and second intermediate features of at least one historical frame of the current frame to obtain third intermediate features of the current frame.

11. The method according to claim 8, wherein the target chunk further comprises at least one future frame following the valid frame.

12. The method according to claim 11, further comprising:

determining number of the future frames based on a delay requirement of a current voice recognition scenario.

13. An apparatus for training a real-time voice recognition model, the apparatus comprising:

a memory operable to store computer-readable instructions; and a processor circuitry operable to read the computer-readable instructions, the processor circuitry when executing the computer-readable instructions is configured to:

obtain an audio feature sequence of sample voice data, the audio feature sequence comprising audio features of a plurality of audio frames of the sample voice data;

input the audio feature sequence to an encoder of the real-time voice recognition model;

chunk the audio feature sequence into a plurality of chunks by the encoder according to a mask matrix;

encode each of the chunks to obtain a hidden layer feature sequence of the sample voice data, the hidden layer feature sequence comprising hidden layer features of each of the chunks, a chunk comprising at least two consecutive audio frames among the plurality of audio frames, at least one overlapping audio frame being present between two adjacent chunks, the encoder encoding a current chunk using an intermediate processing result, stored in a buffer region, for at least one historical chunk having an overlapping audio frame with the current chunk, and the historical chunk referring to an encoded chunk having at least one overlapping audio frame with a target chunk;

decode the hidden layer feature sequence by a decoder of the real-time voice recognition model to obtain a predicted recognition result for the sample voice data; and train the real-time voice recognition model based on the predicted recognition result and a real recognition result of the sample voice data;

wherein the encoder comprises n encoding layers in series, n being an integer greater than 1, and the processor circuitry is configured to:

determine chunks corresponding to a first encoding layer according to the mask matrix, comprising: at least one valid frame, at least one historical frame preceding the valid frame, and at least one future frame following the valid frame; and determine chunks corresponding to an $i^{th}$ encoding layer according to the mask matrix, comprising: at least one valid frame and at least one historical frame preceding the valid frame, i being an integer greater than 1 and less than or equal to n, wherein a future frame following a valid frame is only used in determining chunks corresponding to the first encoding layer.

14. The apparatus according to claim 13, wherein the mask matrix comprises a plurality of groups of elements, each group of elements being for indicating audio frames contained in a chunk, and audio frames contained and not contained in a chunk being distinguished by two different values in each of the groups of elements.

15. The apparatus according to claim 13, wherein the encoder comprises n encoding layers in series, n being an integer greater than 1, each of the n encoding layers comprises a multi-head self attention module, and audio frames which do not belong to the current chunk are masked by the mask matrix when the multi-head self attention module computes a multi-head self attention coefficient.

16. The apparatus according to claim 13, wherein the processor circuitry is configured to:

input the audio feature sequence to a first encoding layer of the encoder, and encoding the audio feature sequence through the first encoding layer to obtain an output feature sequence of the first encoding layer; and input an output feature sequence of an $(i-1)^{th}$ encoding layer relative to an $i^{th}$ encoding layer of the encoder to the $i^{th}$ encoding layer, and encoding the output feature sequence of the $(i-1)^{th}$ encoding layer through the $i^{th}$ encoding layer to obtain an output feature sequence of the $i^{th}$ encoding layer, the $i^{th}$ encoding layer encoding the current chunk using output features, stored in the buffer region, of the at least one historical chunk in the $(i-1)^{th}$ encoding layer, and an output feature sequence of an $n^{th}$ encoding layer of the encoder being used as the hidden layer feature sequence.

17. The apparatus according to claim 16, wherein the processor circuitry is further configured to generate an output feature sequence, based on an input feature sequence, in each of the n encoding layers by:

feeding forward the input feature sequence to obtain a first intermediate feature sequence;

processing the first intermediate feature sequence using a multi-head self attention mechanism to obtain a second intermediate feature sequence;

convolving the second intermediate feature sequence to obtain a third intermediate feature sequence;

feeding forward the third intermediate feature sequence to obtain a fourth intermediate feature sequence; and normalizing the fourth intermediate feature sequence to obtain the output feature sequence.

* * * * *